United States Patent [19]

Sekiya

[11] Patent Number: 4,816,924
[45] Date of Patent: Mar. 28, 1989

[54] LASER PRINTER WITH TONER IMAGE DENSITY CONTROL

[75] Inventor: Makoto Sekiya, Okazaki, Japan

[73] Assignee: Minolta Camera Kabushiki Kaisha, Osaka, Japan

[21] Appl. No.: 114,281

[22] Filed: Oct. 27, 1987

[30] Foreign Application Priority Data

Oct. 27, 1986 [JP] Japan ................... 61-255095

[51] Int. Cl.⁴ .................. H04N 1/21; G03G 15/00
[52] U.S. Cl. .................. 358/296; 358/298; 355/14 D; 346/160
[58] Field of Search ........... 358/296, 298, 300, 302; 346/108, 160; 355/14 D, 14 L

[56] References Cited

U.S. PATENT DOCUMENTS

| | | | |
|---|---|---|---|
| 4,239,372 | 12/1980 | Iwai | 355/14 R |
| 4,272,182 | 6/1981 | Abe et al. | 355/14 D |
| 4,416,535 | 11/1983 | Tottori | 355/14 D |
| 4,639,117 | 1/1987 | Murai | 355/14 D |
| 4,743,944 | 5/1988 | Tomasada | 355/14 R |

Primary Examiner—E. A. Goldberg
Assistant Examiner—Mark Reinhart
Attorney, Agent, or Firm—Price, Gess & Ubell

[57] ABSTRACT

An improved laser printer having a density sensor which reads a density of an automatic image density control (AIDC) mark formed outside an image area on a photoconductor 2. A CPU controls a solenoid based on an output of the density sensor and regulates the amount of toner supply to a developing device. A start counter and an end counter define a start position and an end position in both the primary scanning direction of the image area and in the main scanning direction of the AIDC mark. The start and end positiones are based on timer values set in their respective counters.

3 Claims, 25 Drawing Sheets

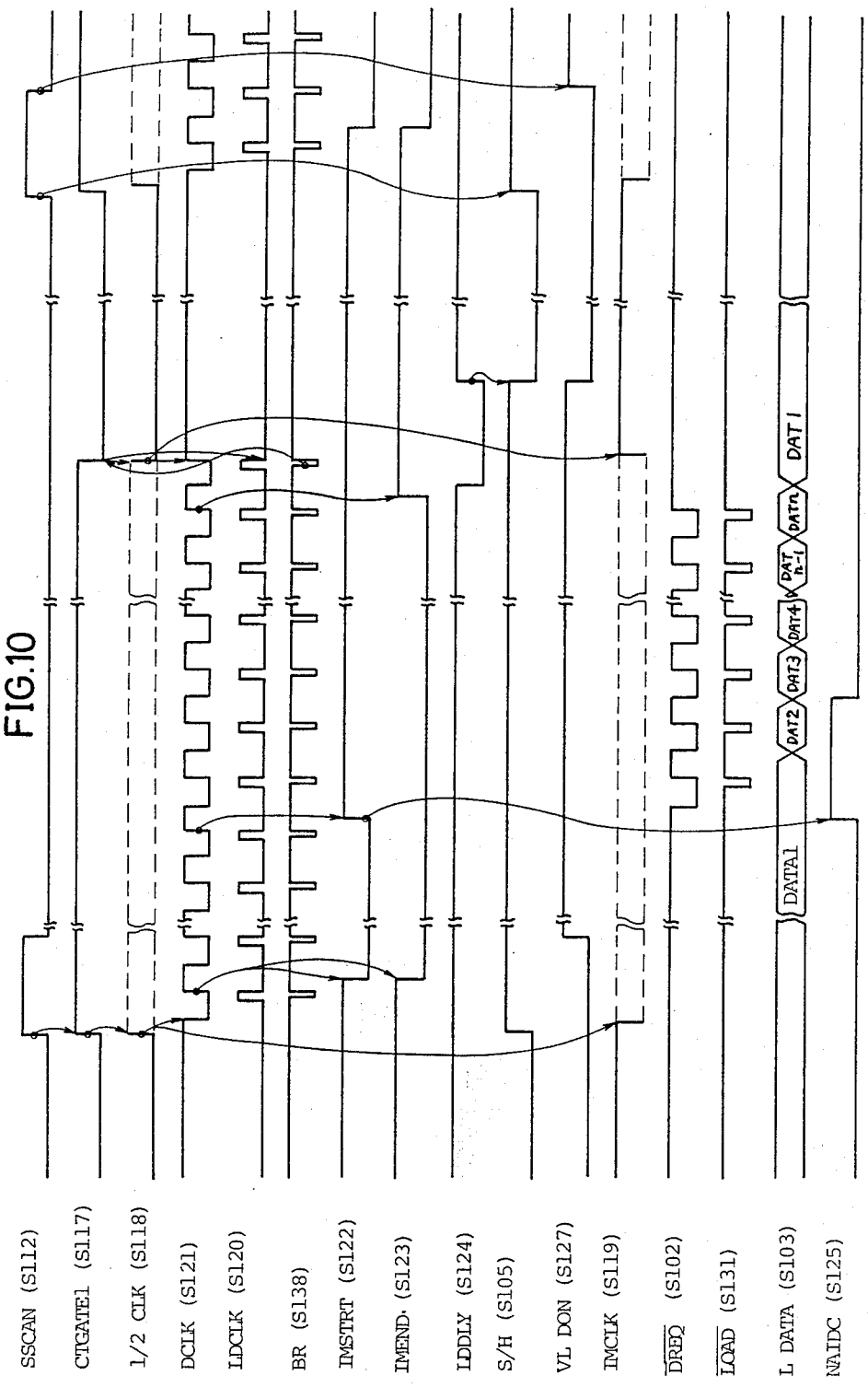

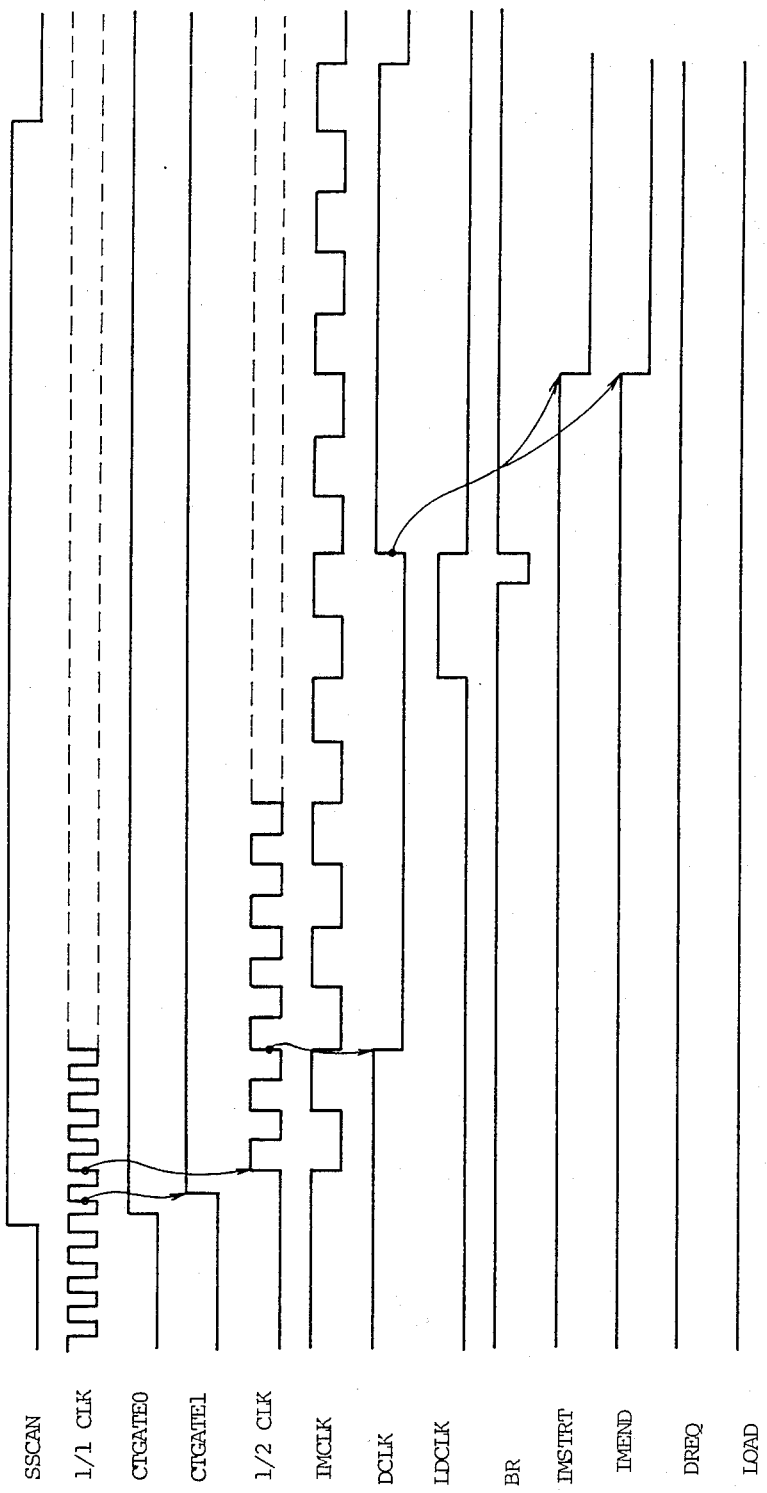

LASER PRINTER WITH TONER IMAGE DENSITY CONTROL

BACKGROUND OF THE INVENTION

1. Field of the Invention

The present invention relates to a laser printer and particularly to a laser printer capable of automatically controlling an image density.

2. Description of the Prior Art

In a laser printer, a latent image is formed on a photoconductor drum by using a laser beam deflected by a polygon mirror rotating at high speed, and the image is caused to be visible by development of toner and then it is transferred onto plain paper and fixed. Since the laser beam can be modulated at high speed in a laser printer, the laser printer achieves printing of letters or graphics of high quality (high density) at high speed. Accordingly, laser printers are widely utilized as output apparatus of various data processing systems or image processing systems using computers.

The above described printing process of a laser printer is similar to an electrophotographic process and a density of an image printed finally on plain paper is changed dependent on an amount of toner. Consequently, in order to maintain a density of an image in the most suitable state, it is necessary to control the amount of toner.

On the other hand, in the technical field of copying apparatus using an electrophotographic process, the U.S. Pat. Nos. 4,272,182, 4,239,372 or 4,416,535 for example proposes a density control system in which an electrostatic latent image corresponding to a mark of a predetermined density is formed and the density of the toner image based on the electrostatic latent image is detected to control supply of toner based on the detected density. The mark is provided on a lower surface of an end of a document table of glass and an image of the mark is projected on a photoconductor by means of an optical system, whereby the electrostatic latent image corresponding to the mark is formed.

If the above described density control system is applied to a laser printer, an electrostatic latent image (i.e. a reference image) corresponding to a mark is formed by the scanning of the laser printer. However, the reference image should be formed outside an image area and in a fixed position corresponding to a position of a toner density sensor. Positioning of an image area is controlled usually by using a timer or a counter based on a signal from a sensor for detecting a start position of scanning of the laser beam (this sensor being called a start-of-scan sensor). In the case of applying the above described density control system to a laser printer, it is necessary to provide a timer or a counter for a reference image, other than a timer or a counter for an image area and accordingly construction of the printer is complicated and the manufacturing cost thereof becomes high.

SUMMARY OF THE INVENTION

An object of the present invention is to provide an improved laser printer so that image density can be made stable based on the detected density of a reference image formed and developed on a photoconductor.

Another object of the present invention is to provide a laser printer which does not require a special timer or counter for forming a reference image.

Briefly stated, in the present invention, a timer value corresponding to an image formation start position in an image area and a timer value corresponding to an image density detection mark formation start position outside the image area are set in timer means to be operated in response to a reference signal for start of laser beam scanning, and modulation of laser beam is started when measurement of the timer means comes to an end. As a result, the density of a toner image of the mark formed on a photoconductor is detected and a developing means is controlled based on the detected result.

According to the present invention, it becomes possible to provide a new laser printer capable of automatically controlling the image density.

According to another aspect of the present invention, the timer means is used for determining the image formation start position in the image area as well as for determining the image density detection mark formation start position outside the image area and accordingly it is not necessary to provide a special timer means for the image density detection mark and increase of the manufacturing cost of the laser printer can be avoided.

These objects and other objects, features, aspects and advantages of the present invention will become more apparent from the following detailed description of the present invention when taken in conjunction with the accompanying drawings of the laser printer of the above stated embodiment.

BRIEF DESCRIPTION OF THE DRAWINGS

FIGS. 9, 10, 11A, 11B, and 11C are timing charts showing states and timings of the re signals of the laser printer of the above stated embodiment.

DESCRIPTION OF THE PREFERRED EMBODIMENTS

Figure 1:
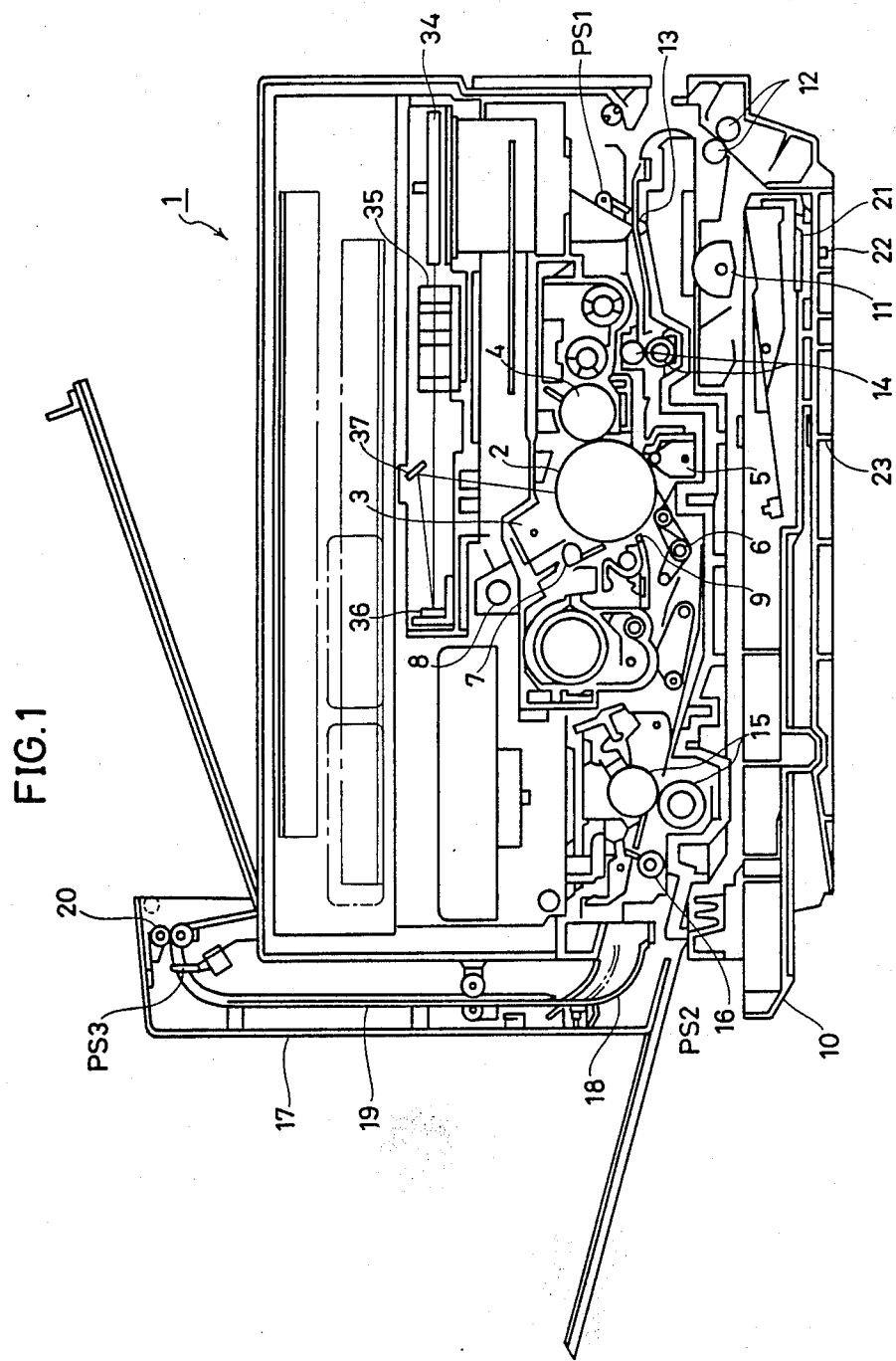
FIG. 1 is a front sectional view of a laser printer of an embodiment of the present invention.

FIG. 1 is a sectional view showing a laser printer 1 of an embodiment of the present invention. A photoconductor 2 has the form of a drum and a latent image is formed on its surface when a laser beam is scanned thereto. In association with the photoconductor 2, there is an electrification charger 3 for uniformly charging the photoconductor 2, a developing device 4 for developing a latent image formed by scanning of a laser beam, a transfer charger 5 for transferring the developed toner image onto paper, a separation belt 6 for separating the paper from the photoconductor 2, a cleaner blade 7 for removing residual toner after the transfer, an eraser 8 for emitting light to remove electric charge, thereby to attain a uniformly charged state by means of the electrification charger 3, and a density reader 9 for reading a density of toner. A paper cassette 10 containing sheets of copy paper is provided in a lower portion of the laser printer 1. A paper feed roller 11 having a semi-circular section is provided to guide sheets of paper contained in the paper cassette 10 to a transport path. Transport rollers 12 and 13 and resist rollers 14 are provided in the transport path. The registration rollers 14 serve to determine a printing position for paper in a sub-scanning direction (which is a direction perpendicular to a direction in which a laser beam scans the drum 2, while the latter direction is referred to as a main scanning direction). Fixing rollers 15 serve to fix the toner transferred by the transfer charger 5. A main body discharge roller 16 is provided to discharge the paper passing through the fixing rollers 15 to outside the main body. A reversing unit 17 is provided to discharge the paper, directing the printed surface of the paper downward. The reversing unit 17 comprises a paper guide claw 18 which can be manually operated for selecting discharge with the printed face directed downward or discharge with the printed face directed upward, a transport path 19 for discharge with the printed face directed downward, and discharge rollers 20. There are further provided a magnet group 21 and a paper size sensor 22 to determine a paper size of the sheets in the paper cassette 10. This determination is made by detection by the paper size sensor 22 as to whether a magnet exists in an area of three bits. The laser printer 1 further comprises a paper empty sensor 23 for detecting absence of paper in the paper cassette 10, and paper sensors PS1, PS2 and PS3.

Figure 2:
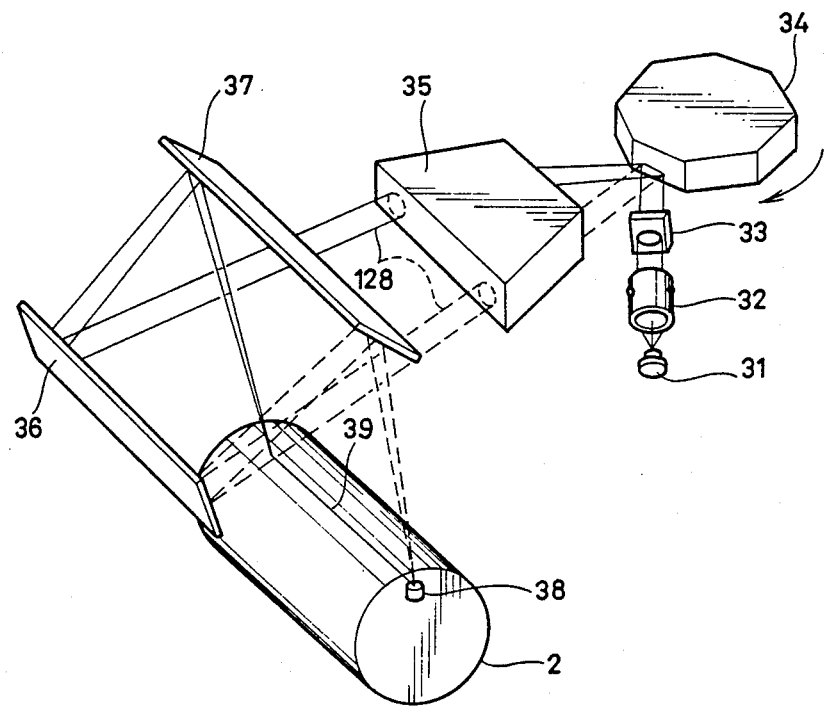
FIG. 2 is a perspective view representing an optical system of the laser printer shown in FIG. 1.

FIG. 2 is a perspective view showing an optical system of the laser printer 1. Referring to FIGS. 1 and 2, a laser diode (referred to hereinafter as LD) 31 is driven by an LD drive portion to be described afterwards. A collimator lens 32 and a cylindrical lens are provided to correct a spreading range of a laser beam emitted from the LD 31. A polygon mirror 34 rotates so that a laser beam reflected on the polygon mirror 34 is applied to the photoconductor 2 as a scanning beam 39. The laser beam reflected on the polygon mirror 34 passes through a lens 35 of $f\theta$. The $f\theta$ lens 35 serves to scan the laser beam on the photoconductor 2 at uniform speed. Reflection mirrors 36 and 37 are provided to guide the laser beam passing through the $f\theta$ lens 35 to the photoconductor 2. A beam detector 38 is provided near a side end of the photoconductor 2 so as to determine a printing position in the main scanning direction. The optical system in FIG. 2 is adapted so that the scanning beam 39 scans the photoconductor 2 after it passes through the beam detector 38.

Figure 3:
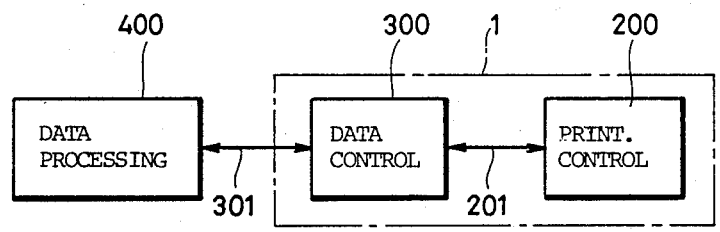
FIG. 3 is a system block diagram for explaining the use of the laser printer of the above stated embodiment.

FIG. 3 is a system block diagram for explaining use of the laser printer 1. In this system, the laser printer is connected to a general-purpose data processing apparatus 400 (such as a word processor, a personal computer or other host computer). The laser printer 1 comprises a data control portion 300 and a printing control portion 200.

When a printing request is generated in the data processing apparatus 400, printer control data for determining a printing operation mode in the laser printer 1 and printing data for determining printed contents are transmitted to the data control portion 300 through an interface 301 in the form of coded data, because the coded data serves to reduce transmission time. The data control portion 300 receives the coded data and if the coded data thus received is the printer control data, the data is transmitted to the printing control portion 200 of the laser printer 1 through an interface 201 to be described afterwards. On the other hand, if the coded data thus received is the printing data, the coded data is converted to bit image data and then it is developed in a memory called a bit map memory capable of storing bit image data for one page. When data for one page is developed, a printing start request is issued to the printing control portion 200 of the laser printer 1 through the interface 201. Upon receipt of the printing start request, the laser printer 1 starts printing operation. In an exposure process, the image data is read out from the bit map memory through the interface 201 and the beam from the LD 31 is modulated based on the data, whereby a latent image is formed on the photoconductor 2.

A protocol of the interface 201 and printing control of the laser printer 1 will be described in the following. The interface 201 serves to communicate data between the data control portion 300 and the printing control portion 200 in the laser printer 1. It functionally includes two interfaces 201a and 201b described below.

Figure 5:
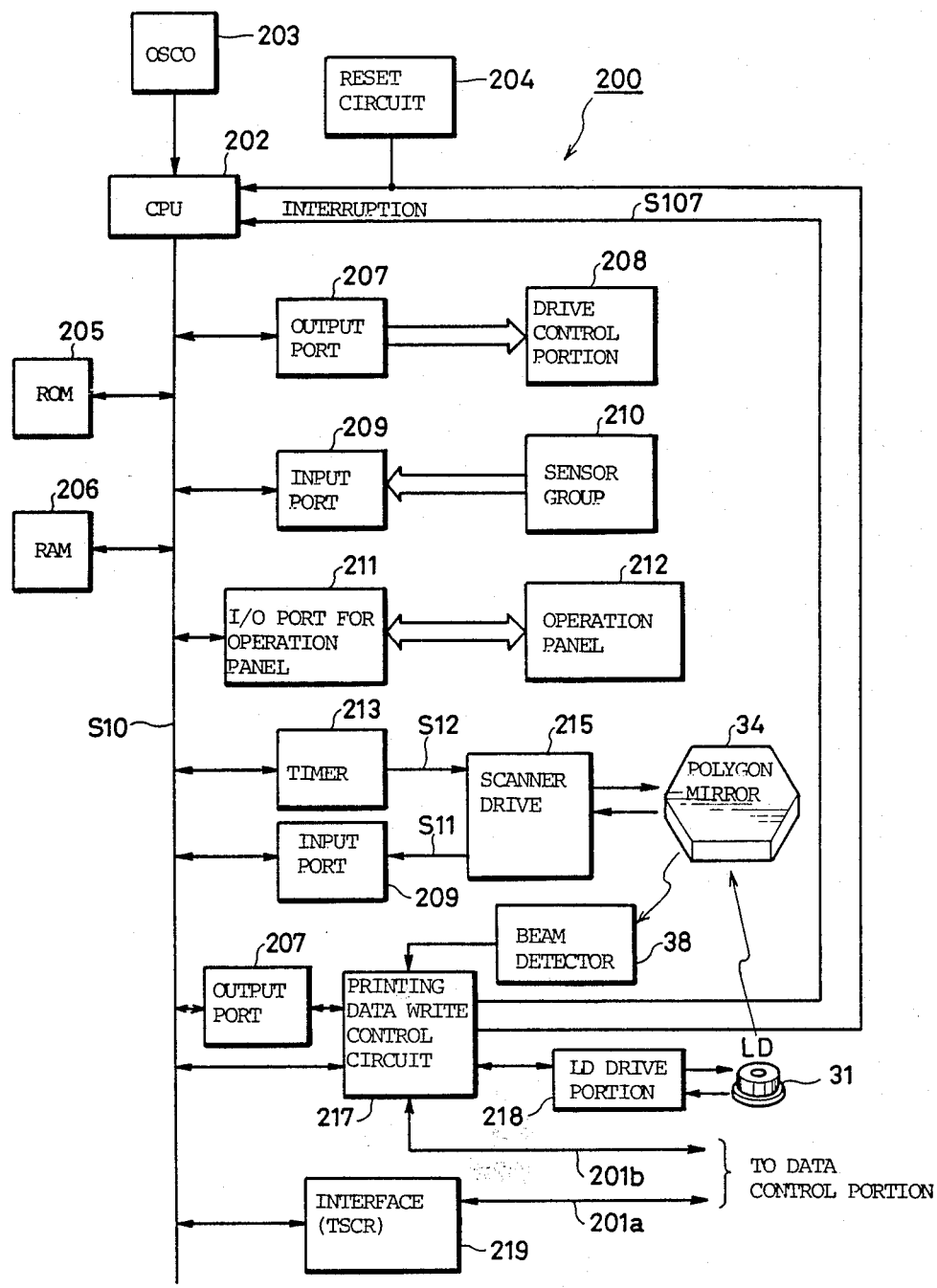
FIG. 5 is a block diagram showing details of a printing control portion shown in FIG. 3.

Referring to FIG. 5 showing details of the printing control portion 200, a control interface 201a is used to communicate data concerning operation control of the laser printer 1. More specifically, the data control portion 300 transmits data for designating a print mode of a feed opening or a discharge opening, and data for determining timing for a printing start request or the like. On the other hand, the printing control portion 200 transmits data for indicating conditions in the laser printer 1 such as paper size information or error information, and data for determining timing for completion of printing, discharge of paper or the like. This interface 201a communicates command data and status data. The command data is data for determining timing, while the status data is other data. The command data and the status data are shown in Tables 1 and 2.

TABLE 1

| | Commands | | |
|---|---|---|---|
| Direction of transmission | Command | Meaning | Answer |
| Data control portion → Laser printer | Print command | Printing request for 1 sheet | To be given |
| | Printing density command | Printing density change request (with charged printing density data) | To be given |
| Laser printer → Data control portion | Exposure end command | Notification of end of exposure | Not to be given |

TABLE 2

| Status | | | |
|---|---|---|---|
| Data control portion | | Laser Printer | |
| Status | Meaning | Status | Meaning |
| Feed opening | Setting of feed opening | READY | Ready for printing |
| | | PAPER EMPTY | Nonexistence of paper in cassette |
| | | TONER EMPTY | Less than predetermined amount of toner |
| | | JAM | Occurrence of paper jam |

TABLE 2-continued

| Data control portion | | Status | |
|---|---|---|---|
| Status | Meaning | Laser Printer Status | Meaning |
| | | ERROR | Occurrence of other errors |

An image interface 201b is used to read out image data from the bit map memory of the data control portion 300 when a latent image is being formed on the photoconductor 2, that is, exposure is being effected.

Figure 4:
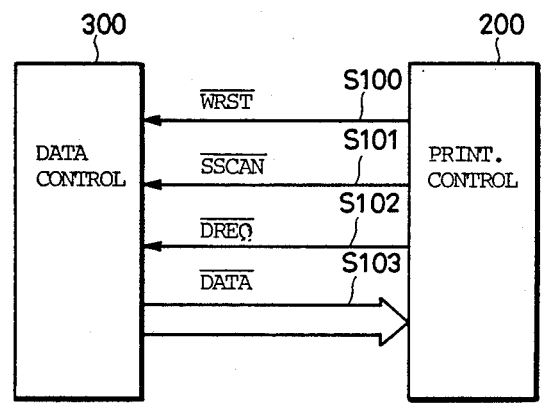
FIG. 4 is an illustration showing signal lines of an interface 201.

FIG. 4 is an illustration showing signal lines of the image interface 201b. S100 is a write raster signal $\overline{WRST}$ indicating that exposure is being effected. S101 is a sensor scan signal $\overline{SSCAN}$ indicating that the scanning beam 39 (as shown in FIG. 2) of the laser beam has passed through the beam detector 38. S102 is a data request signal $\overline{DREQ}$ for requesting image data of eight bits. S103 is an image data signal of eight bits outputted in response to the $\overline{DREQ}$ signal. The $\overline{WRST}$ signal S100 falls to an L level at the time of exposure, whereby the data control portion 300 is ready for transmitting image data. Start of one line is detected at the fall of the $\overline{SSCAN}$ signal S101 and eight-bit parallel data is transmitted to the laser printer synchronously with the rise of the $\overline{DREQ}$ signal S102.

FIG. 5 is a block diagram showing a construction of the printing control portion 200 of the laser printer 1. The printing control portion 200 has a so-called multi-chip construction including a CPU 202 as a center, in which data can be communicated among the respective chips through a bus S10. The CPU 202 is connected with an oscillator 203 for generating clock pulses for synchronizing with operation of the CPU 202, and a reset circuit 204 for resetting the whole circuit when power supply is turned on. The bus S10 connected to the CPU 202 is connected with a system ROM 205 for storing a control program and a system RAM 206 to be an operation area of the control program. The bus S10 is further connected with an output port 207 and an input port 209. The output port 207 is connected with a drive control portion 208 for driving a motor, a solenoid, a heater and the like. The input port 209 is connected with a sensor group 210 including a paper sensor, a density sensor and the like. The bus S10 is further connected with an operation panel 212 having display elements such as LEDs or input elements such as switching elements through an I/O port 211 for the operation panel.

A scanner drive portion 215 serves to control rotation of the polygon mirror 34. It determines the rotating speed of the polygon mirror 34 in response to clock pulses S12 emitted from a timer 213. The value of the timer 213 can be set in response to an instruction transmitted from the CPU 202 through the bus S10. Consequently, the rotating speed of the polygon mirror 34 can be changed and set arbitrarily by the CPU 202, so that the printing density can be changed. The scanner drive portion 215 transmits to the input port 209 a polygon lock signal S11 indicating whether the polygon mirror 34 rotates at a constant speed or not.

An LD drive portion 218 for controlling drive of the LD 31 modulates a beam of the LD 31 based on a signal transmitted from a printing data write control circuit 217. The printing data write control circuit 217 prepares modulation data for the LD drive portion 218 based on the image data transmitted from the data control portion 300 through the image interface 201b, so as to turn on and off the scanning beam 39 at a predetermined position on the photoconductor 2. The printing data write control circuit 217 is connected with the beam detector 38. The printing data write control circuit 217 is further connected with the bus S10 and the output port 207. The control interface 201a is controlled by an interface control circuit 217 connected to the bus S10.

Figure 6:
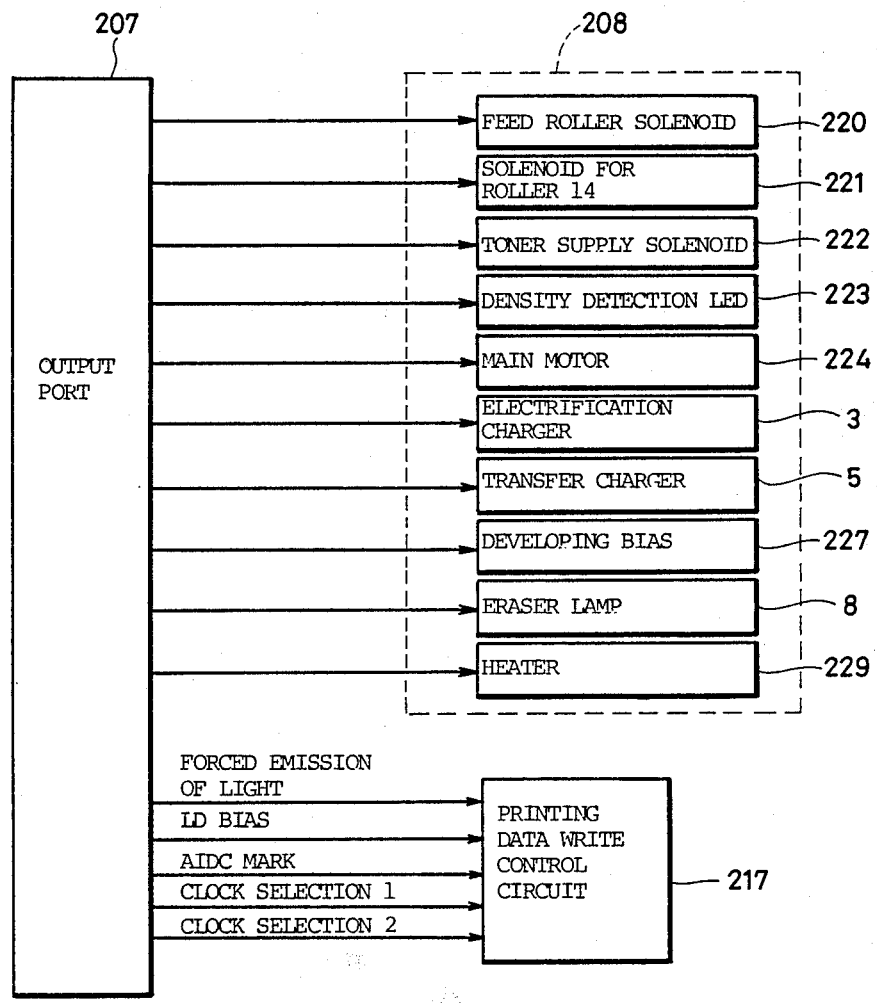
FIG. 6 is an illustration for explaining signals from n output port shown in FIG. 5.

FIG. 6 shows output signals of the output port 207. FIG. 6 only represents the components to be driven, circuits and connections for driving those components being omitted from the illustration. The mechanical drive portions such as rollers and a toner supply portion in this embodiment are all driven by a chain wire driven by the main motor 224 and they are turned on and off by means of clutches using solenoids. The output signals transmitted from the output port 207 to the drive control portion 208 include: a signal to the solenoid 220 for determining whether drive of the above stated chain wire is to be transmitted to the feed roller 11 or not; a signal to the solenoid 221 for the registration rollers 14; a signal to the solenoid 222 for determining whether a portion for supplying toner to the developing device 4 is to be driven or not; a signal to the LED 223 attached to the density reader 9; a signal to the main motor 224; a a signal to the electrification charger 3; a signal to the transfer charger 5; a signal to a voltage applying device and the high-voltage power supply 227 thereof for applying to the developing device 4 a relative potential with respect to the photoconductor 2 (referred to hereinafter as a developing bias voltage), to cause toner in the developing device 4 to adhere only to the latent image formed on the photoconductor 2; a signal to the eraser lamp 8; and a signal to the heater 229. Output signals transmitted to the printing data write control circuit 217 will be described afterwards.

Figure 7:
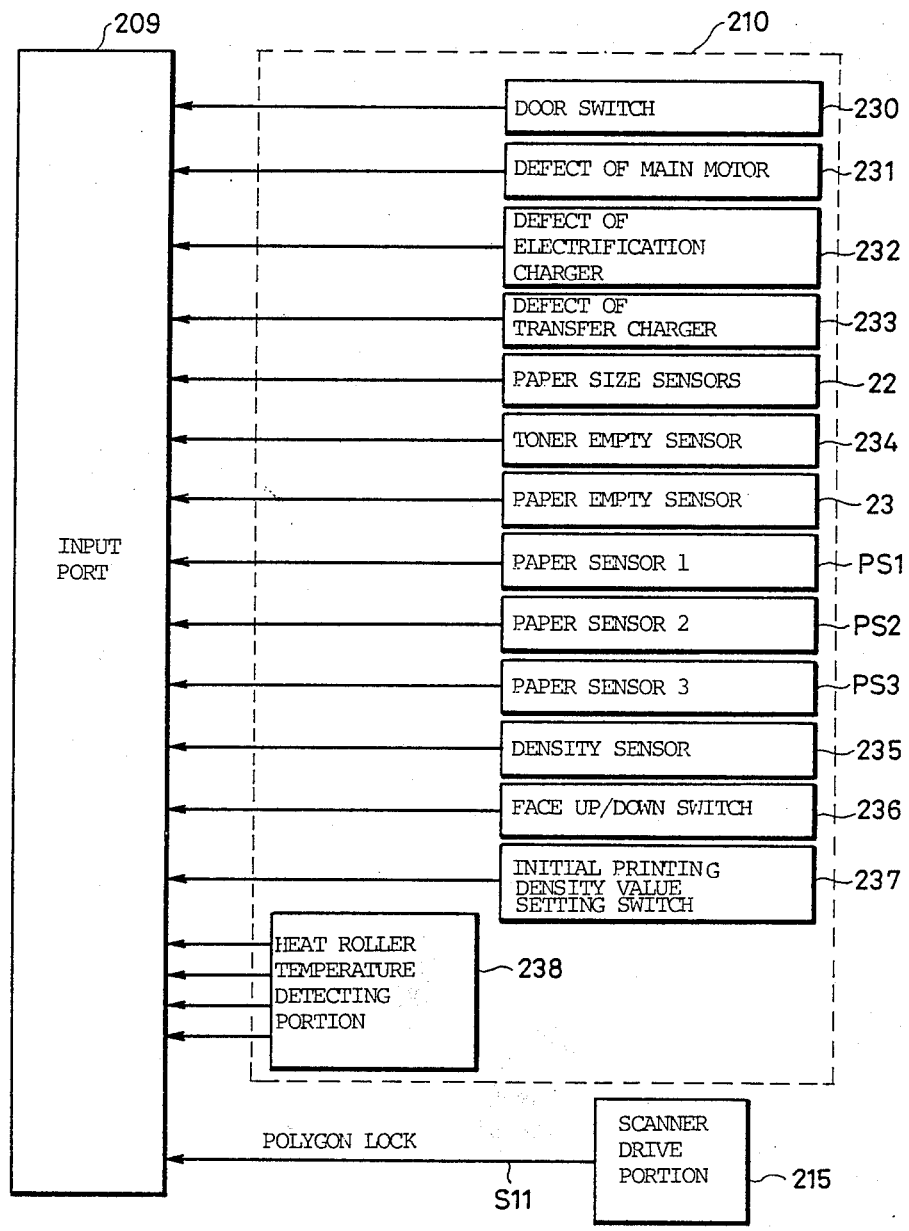
FIG. 7 is an illustration for explaining signals to an input port shown in FIG. 5.

FIG. 7 shows input signals applied from the sensor group 210 and the scanner drive portion 215 to the input port 209. In FIG. 7, only objects to be detected by the sensor group 210 are shown and concrete connections and comparators or the like are omitted from the illustration. The input signals applied from the sensor group 210 to the input port 209 include: a signal from a switch 230 for detecting opening or closing of a door for separating the laser printer 1 from outside; a signal from a defect detector 231 of the main motor 224; a signal from a defect detector 232 of the electrification charger 3; a signal from a defect detector 233 of the transfer charger 5; a signal from the paper size sensor 22; a signal from a toner sensor 234 for detecting an amount of toner in the developing device 4; a signal from the paper emptiness sensor 23; signals from paper sensors PS1 to PS3; a signal from the density sensor 235 in the density reader 9; a signal from face up/down switch 235 for detecting a direction of the paper guide claw 18; a signal from an initialization switch portion 237 including two switches for setting an initial value of printing density (i.e. density of picture elements) (four different values being able to be set); and the signal from a temperature detector 238 of a heat roller. The temperature detector 238 transmits a temperature of the heater to the input port 209.

Figure 8:
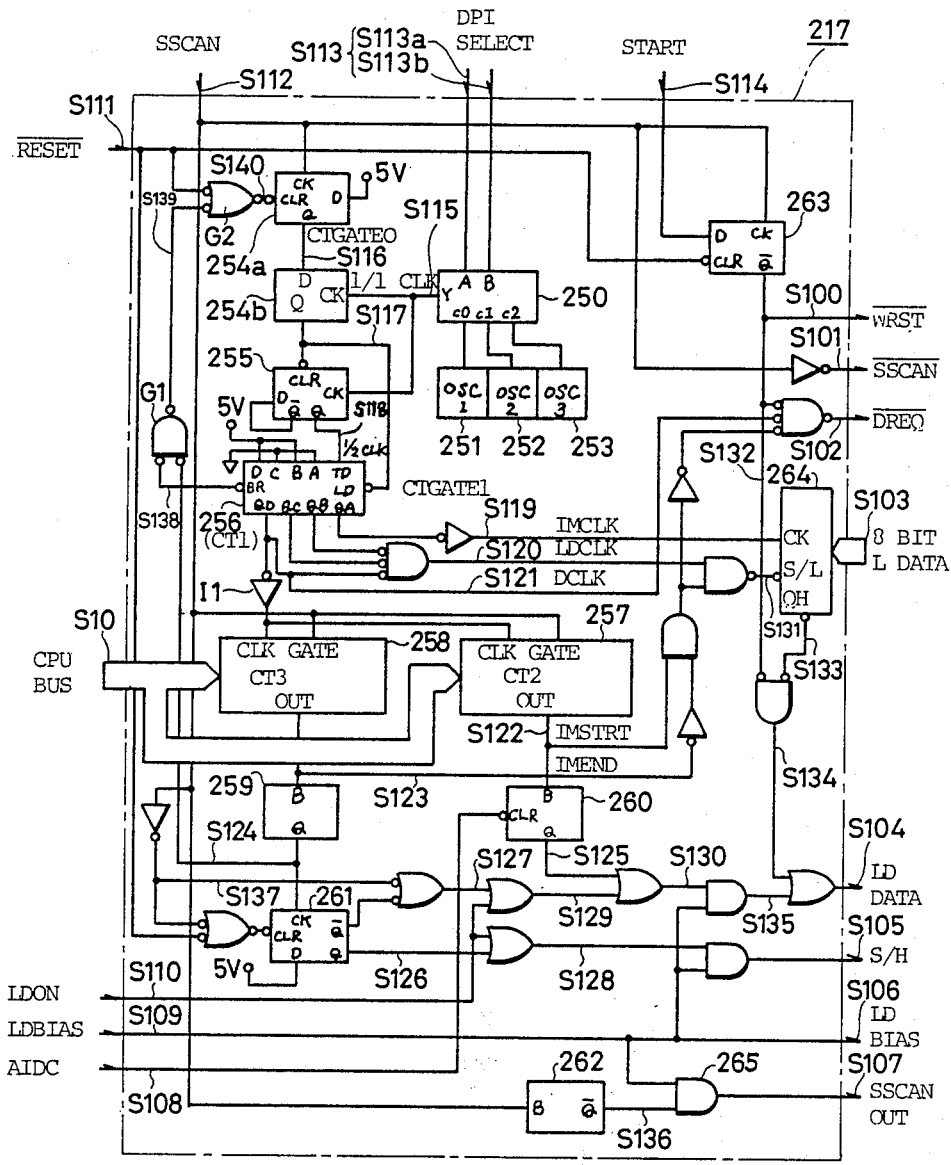
FIG. 8 is a circuit diagram showing an example of the printing data writing control circuit shown in FIG. 5.

FIG. 8 is a detailed circuit diagram of the printing data write control circuit 217.

This circuit 217 serves to determine: a picture printing position in the main scanning direction; a printing position in the main scanning direction of a mark for automatic image density control (referred to hereinafter as the AIDC mark); timing for forced emission of light of the LD 31 outside an image area generating a synchronous signal SSCAN for determining the above stated printing position; sampling timing for automatic power control (referred to hereinafter as APC) of the LD 31. The circuit 217 also serves to detect abnormality in emission of light of the LD 31 and rotation of the polygon mirror 34. Table 3 shows input and output signals to and from the circuit 217.

printing densities are referred to hereinafter as the printing density 1, the printing density 2 and the printing density 3 according to increase of the density value in this order.

Referring now to FIGS. 9, 10 and 11A to 11C, control for determining an image position will be described.

Figure 9:
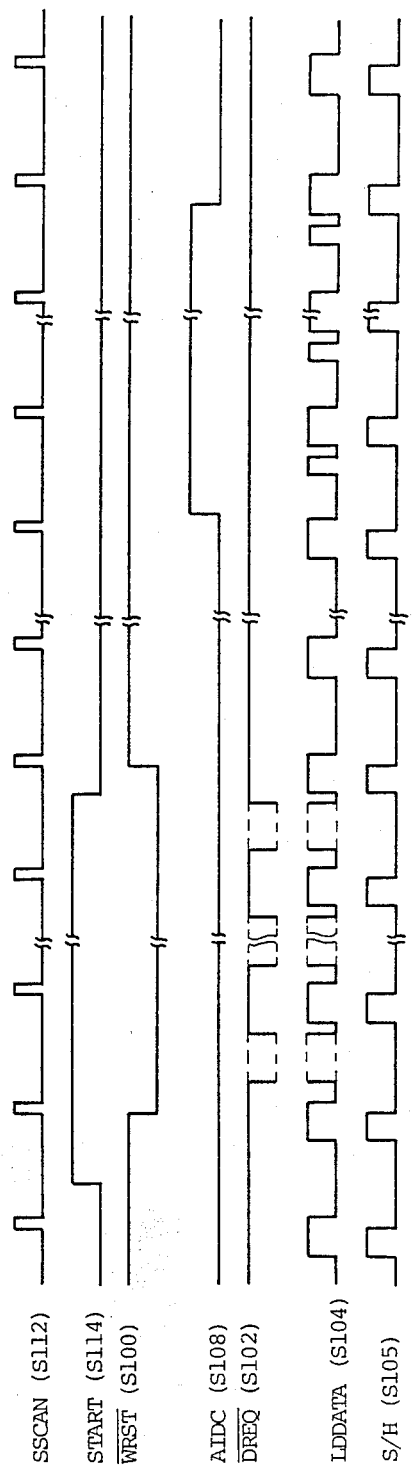

During printing operation, the SSCAN signal S112 is periodically generated from the beam detector 38 as shown in the uppermost portion of FIGS. 9 and 10. At

TABLE 3

| From or to | Signal | Input/ output | Function |
|---|---|---|---|
| Output port 207 | Start S114 | Input | Determination of image area position in sub-scanning direction |
| | AIDC S108 | | Determination of AIDC mark position in sub-scanning direction |
| | LDON S110 | | Forced emission of light of LD 31 for starting operation of circuit |
| | LD Bias S109 | | Determination of existence of bias current for power control of LD 31 |
| | DPI SELECT S113 | | Determination of fundamental clock frequency for printing density |
| Reset circuit 204 | $\overline{RESET}$ S111 | | Establishing of state immediately after power-on |
| Beam detector 38 | SSCAN S112 | Output | Output signal of beam detector 38 as synchronizing signal for writing image |
| Data control portion 300 | $\overline{WRST}$ S100 | Output | A latched signal of START signal by SSCAN signal, which notifies exposure state to data control portion |
| | $\overline{SSCAN}$ S101 | | Inversion of SSCAN |
| | $\overline{DREQ}$ S102 | | Request for 8-bit parallel data |
| | L DATA 0~7 S103 | Input | 8-bit parallel data |
| LD drive portion 218 | LD DATA S104 | Output | Modulation signal of LD31 |
| | S/H S105 | | Intensity sampling timing for automatic power control of LD 31 in LD drive portion 218 |
| | LD Bias S106 | | Same as S109 |
| CPU 202 | SSCAN OUT S107 | Output | Notification of abnormality of polygon mirror 34 and LD 31 |

Referring to FIG. 8, a clock selector 250 selects from three oscillators 251, 252 and 253 clock pulses S115 (referred to hereinafter as fundamental clock pulses) forming a basis for modulation synchronizing clock pulses S119 (referred to hereinafter as image clock pulses) of the LD 31. The selection of the fundamental clock pulses S115 is effected by a DPI SELECT signal S113 from the CPU 202. Thus, a frequency of the image clock pulses S119 can be selected in response to an instruction from the CPU 202, thereby to cause a printing density (i.e. a density of picture elements) of the laser printer 1 to be variable.

In order to change a printing density, it is necessary to change at least two factors out of the rotating speed of the polygon mirror 34, the modulation frequency of the LD 31 and a feeding speed of paper (i.e. a rotating speed of the photoconductor 2) if no change is made in a mechanical construction of the optical system shown in FIG. 2. This embodiment adopts a method of changing the rotating speed of the polygon mirror 34 and the modulation frequency of the LD 31. Initialization at the time of turn-on of power supply is effected according to the state of the above stated initialization switch portion capable of manual operation and the initial value is changed thereafter by setting in a DPIRQ flag a value responding to a change request as described afterwards. Thus, three different printing densities (i.e. densities of picture elements) can be selected. The three different the rise of the SSCAN signal, a sequential operation such as printing in the main scanning direction is started. As shown in FIG. 11A, a Q output (CTGATE0) S116 of a flip-flop 254a rises to an H level at the rise of the SSCAN signal S112 and consequently a Q output (CTGATE1) S117 of a flip-flop 254b rises to the H level in synchronism with the rise of the fundamental clock pulses (1/1 CLK) S115. At the rise of the CTGATE1 signal S117 to the H level, a clear state (CLR) of a flip-flop 255 is cancelled and the flip-flop 255 starts to output ½ frequency divided clock pulses (½ CLK) of the fundamental clock pulses S115 as a Q output S118. Further, in response to the rise of the CTGATE1 signal S117, loading to a four-bit counter 256 (CT1) is cancelled. Accordingly, the four-bit counter 256 starts to count downward in response to input of the ½ frequency divided clock pulses S118, thereby to provide, as QA, QB, QC and QD outputs, clock pulses obtained by frequency division of the ½ CLK by ½, ¼, ⅛ and 1/16, respectively.

Figure 11B:
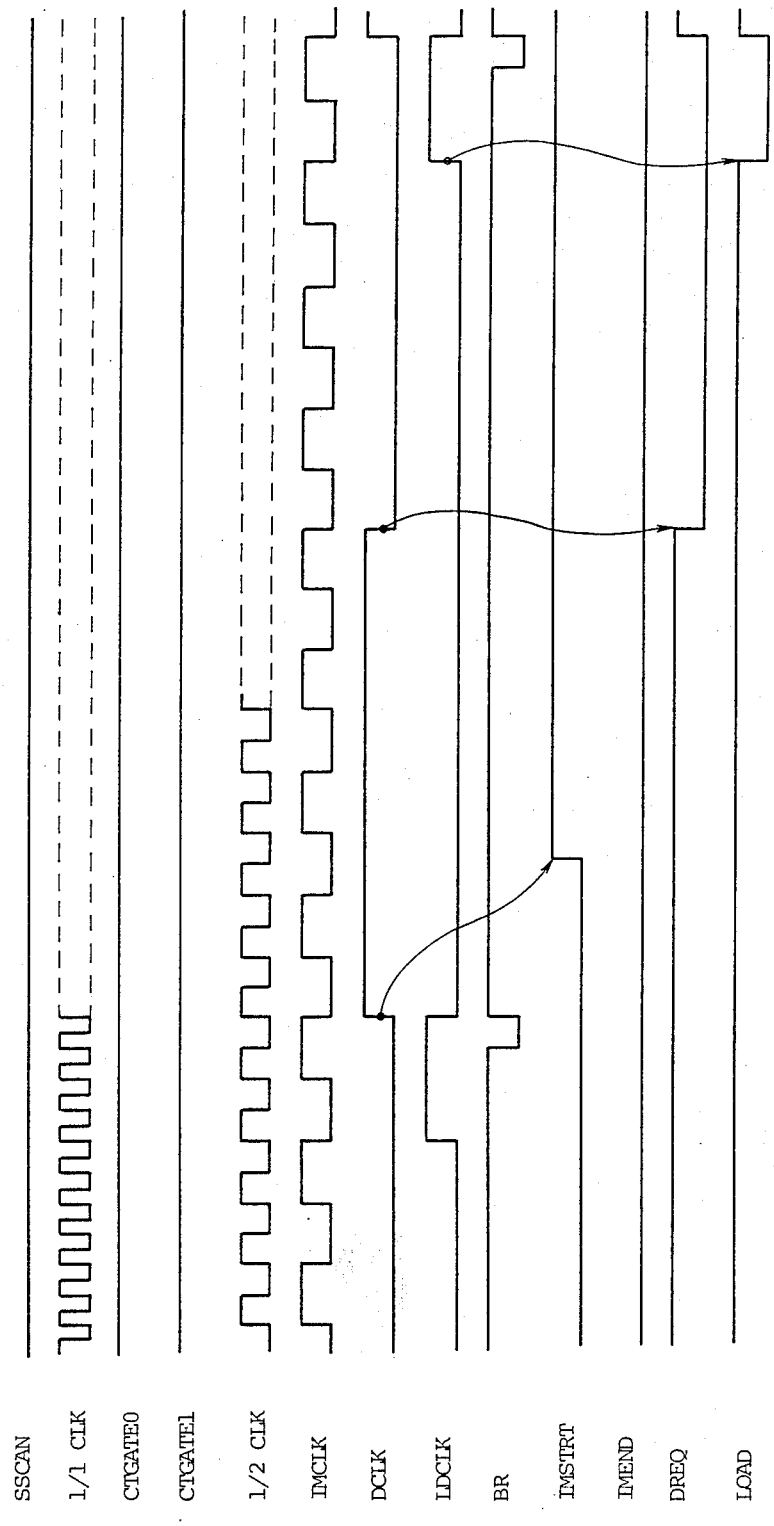
Figure 11C:
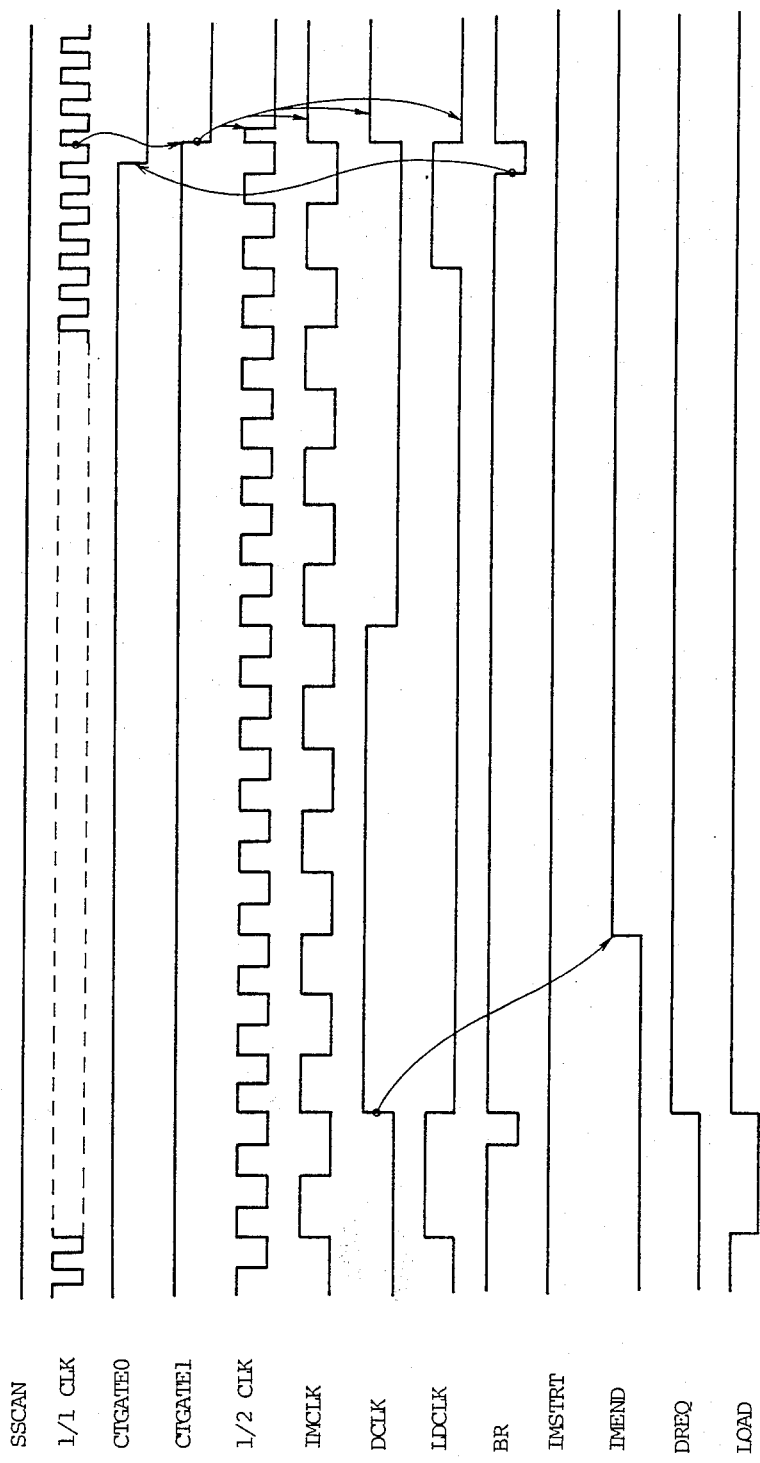

In a start counter 257 (CT2) and an end counter 258 (CT3) for determining a start and an end of printing in the main scanning direction, gates thereof are opened at the rise of the SSCAN signal S112 and then counting is started upon receipt of clock pulses signal obtained by inverting a QD output of the four-bit counter 256 through an inverter I1. Outputs S122 and S123 of the start counter 257 and the end counter 258, respectively, are at the L level during counting operation and they attain the H level when the respective count values thereof become zero by downward counting from the set values. The image area in the main scanning direction is determined by using the outputs of the start counter 257 and the end counter 258. When counting of the end counter 258 comes to an end, the output S123 (IMEND) rises as shown in FIG. 11C and an L pulse is outputted as a Q output S124 from a monostable multivibrator 259. A $\overline{Q}$ output of a flip-flop 261 falls to the L level at the rise of the Q output S124. As a result, the LD DATA signal S104 is forcedly changed to the H level and the LD 31 is caused to emit light.

The forced emission of light of the LD 31 causes again scanning of the beam detector 38, whereby an H pulse of the SSCAN signal S112 is generated. In addition, in response to an output pulse from the monostable multivibrator 259, a borrow (BR) output S138 of the four-bit counter 256 is supplied as a clear (CLR) signal S140 to the flip-flop 254a through a NAND gate G1 and a NOR gate G2. As a result, the Q outputs S116 and S117 of the flip-flops 254a and 254b, respectively, falls to the L level. Accordingly, clock pulses of the Q output S118 from the flip-flop 255 are stopped.

Figure 19:
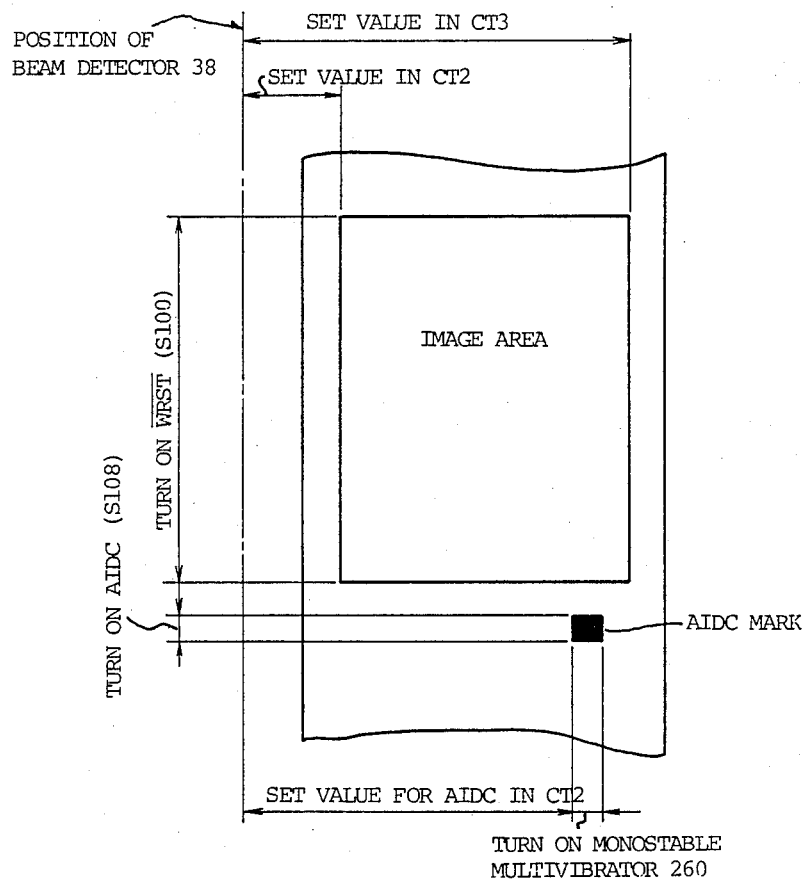
FIG. 19 is an illustration for explaining an image area and a position of an automatic image density control (AIDC) on a photoconductor.

The image area in the main scanning direction is determined by means of the start counter 257 (CT2) and the end counter 258 (CT3) (as shown in FIG. 19). More specifically, the CPU 202 sets prior to exposure suitable values (determined by a paper size) in the start counter 257 for determining a start of an image area at the rise of the SSCAN signal and in the end counter 258 for determining an end of the image area at the rise of the SSCAN signal S112, whereby the image area is determined by the outputs S122 and S123 thereof. FIGS. 11B and 11C are detailed timing charts at points near an end of counting of each of the counters. The $\overline{DREQ}$ signal S102 and the $\overline{LOAD}$ signal S131 are supplied in the image area as shown in FIG. 10. The data control portion 300 transmits eight-bit parallel data (L DATA) S103 to the control portion 200 in response to the rise of the $\overline{DREQ}$ signal S102. In addition, at the L level of the $\overline{LOAD}$ signal S131, a parallel/serial converter 264 accepts data S103 and transmits the data to the LD drive portion 218 as LD drive data (LD DATA) S104 synchronous with the image clock pulses (IMCLK) S119.

An image area in the sub-scanning direction is determined by the $\overline{WRST}$ signal S100 obtained by latching the START signal S114 from the CPU 202 by the SSCANS signal in the flip-flop 263, as shown in FIG. 19. In other words, the $\overline{DREQ}$ signal S102 is transmitted to the data control, portion 300 only when the $\overline{WRST}$ signal S100 is at the H level.

Now, description will be made of a method of making an automatic image density control (AIDC) mark. First, a predetermined area in a given position on the photoconductor 2 is subjected to exposure and then to development. Thus, a mark in black is formed in that given position as the AIDC mark. The AIDC mark is effected as follows. The density of the AIDC mark is read by the reader 9 and if the density is lower than a predetermined density, toner is supplied to the developing device 4. The position of the AIDC mark is needless to say outside the image area; in this embodiment, the position is in a range where printing is effected in the main scanning direction and outside a range where printing is effected in the sub-scanning direction, corresponding to a position adjacent to the latter range (as shown in FIG. 19). Thus, the AIDC mark is formed in the portion used for printing on the photoconductor 2 and adequate density control can be effected in consideration of a change in sensitivity due to use of the photoconductor 2.

The AIDC mark is positioned in the main scanning direction by means of the start counter 257 for determining a start of an image area and the monostable multivibrator 260. More specifically, as shown in FIG. 10, an H pulse is provided out of the $\overline{Q}$ output S125 of the monostable multivibrator 260 at the rise of the output S122 responsive to an end of counting of the start counter 257 having a set value different from the set value for determining the start of the image area, and a mark area corresponds to a period of the H pulse. On the other hand, the AIDC mark is positioned in the sub-scanning direction by cancelling the clear (CLR) state of the monostable multivibrator 260 only at the time of printing (as shown in FIG. 9). Since a period of a pulse outputted from the monostable multivibrator 260 in response to the AIDC signal S108 from the CPU 202 is constant, a width of the mark in the main scanning direction is changed dependent on the printing density.

Description is now made of occurrence of an SSCANOUT signal. The monostable multivibrator 262 provides as a Q output S136 an L pulse of a period a little larger than a pulse period of the SSCAN signal S112, i.e. a beam scanning period of the beam detector 38 in response to the rise of an input signal to an input B. Since the SSCAN signal S112 is connected to the input B, a state of the L level is continued by overlapping with the output L pulse as far as the polygon mirror 34 rotates at a normal rotating speed and the LD 31 normally emits light. However, since the LD 31 does not emit light during a period of the L level of an LDBIAS signal, the SSCANOUT signal is forced to be at the L level by means of an AND gate 265 in that period. The SSCANOUT signal S107 is inputted to an interruption terminal of the CPU 202.

Referring now to the flow charts in FIGS. 12 to 17 and the timing chart in FIG. 18, control operation of the CPU 202 will be described. First, flags and internal timers used for the control operation will be described.

A PRRJT flag indicates a state in which input of the print command is not permitted.

A PRNT flag indicates printing operation. If this flag is "1" and the print command is accepted, printing operation can be started immediately after feeding of paper without requiring preparation for start of the main motor 224 and the photoconductor 2.

A DPIRQ flag indicates a printing density change request as well as a printing density after the change. The value 0 of the flag indicates no request and the values 1, 2 and 3 of the flag indicate a request for change to the printing densities 1, 2 and 3, respectively.

A PLYCH flag indicates that it is necessary to determine whether the rotating speed of the polygon mirror 34 becomes constant or not.

A EXPEND flag indicates an end of exposure.

A BFEXP flag indicates that the print command is accepted and that an exposure process of printing operation is not started.

A DPIAC flag indicates acceptance of a printing density command and a content of the printing density. The value 0 indicates acceptance of no command and the values 1, 2 and 3 indicate acceptance of printing density commands having requests for change to the printing densities 1, 2 and 3, respectively.

TIM 0 to 14, TIM E0 to E2, TIM S0 to S1 and TIMNX are internal timers for determining timing for turning on and off the respective components during printing operation.

Figure 18:
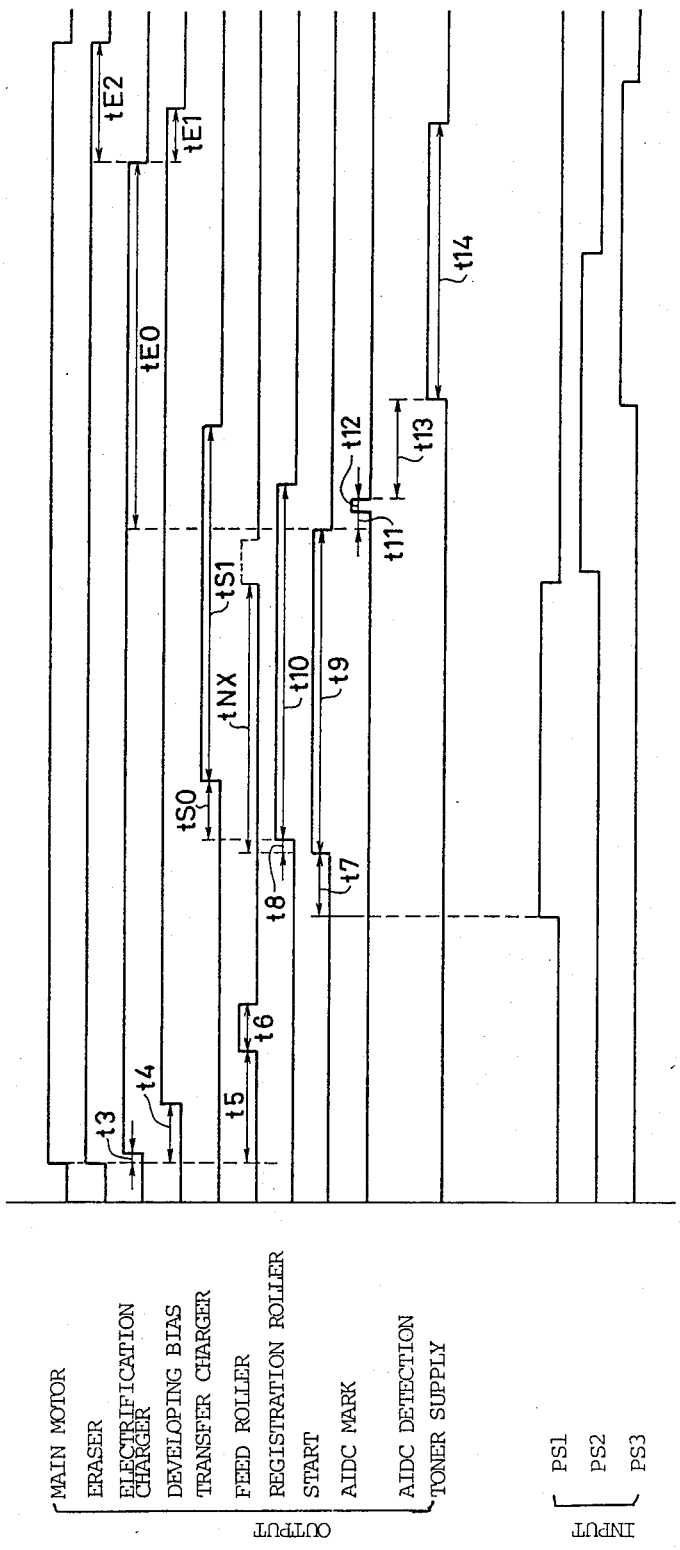
FIG. 18 is a timing chart showing operation timing of main components of the laser printer of the above stated embodiment.

The characters t1 to t14, tE0 to tE2, tS0 to tS1 and tNX are timer values as shown in detail in the timing chart of FIG. 18. If the value t0 is set, counting of a timer is immediately brought to an end.

Figure 12:
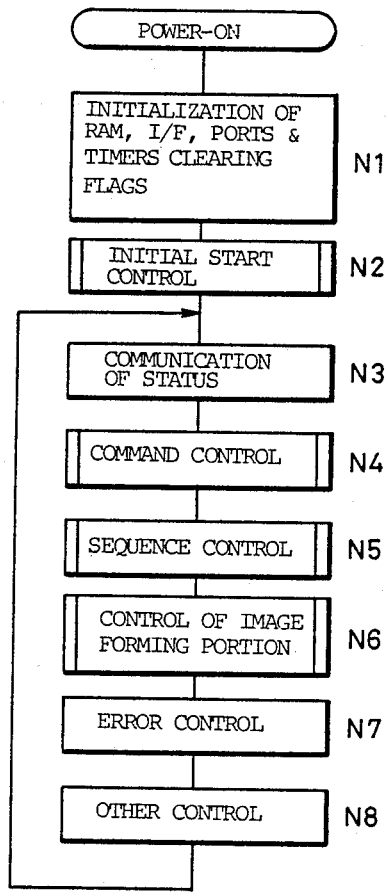
FIGS. 12, 13, 14A, 14B, 14C, 15A, 15B, 15C, 16A, 16B, and 17 are flow charts showing control procedures of the laser printer of the above stated embodiment.

FIG. 12 is a main flow chart of control operation. When the power supply is turned on, the RAM 206, the interface 201a, the input port 207, the output port 209, the timer 213, the start counter 257 [CT2] and the end counter 258 (CT3) are initialized. As a result, the timer 213 outputs clock pulses S12 having a period determined by the set value and the start counter 257 and the end counter 258 maintain the state of the L level while counting clock pulses inputted from outside. Further, the above stated flags and the internal timers are cleared (in the step N1).

Figure 13:
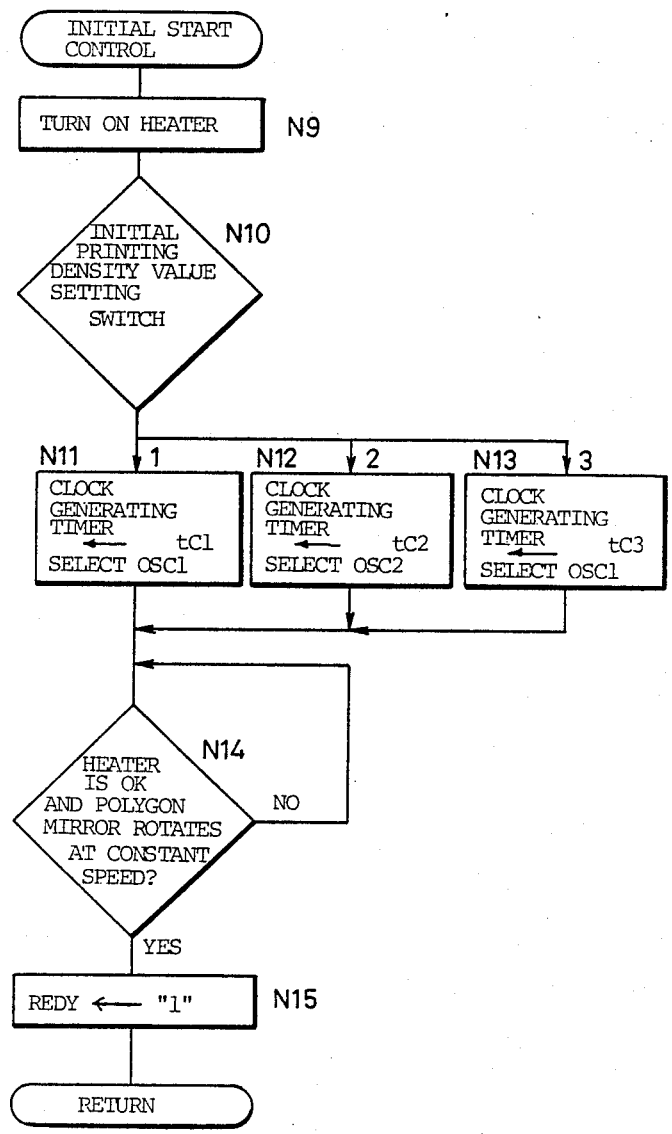

Then, initial start control operation is performed (in the step N2). FIG. 13 is a flow chart showing details of this control operation. First, a heater 229 of the fixing rollers 15 is turned on (in the step N9) and the value of the initialization switch 237 for the printing density is read out (in the step N10). Since the switch portion 237 includes two switches, four different states 0, 1, 2 and 3 can be provided corresponding to the printing densities 1, 2 and 3, respectively. Subsequently, a suitable value is set for the timer 213 and the DPISELCT signal S113 is set to a suitable value to obtain the rotating speed of the polygon mirror 34 and the frequency of the fundamental clock pulses according to the selected printing density (in the steps N11, N12 and N13). Thus, if the initialization switch portion 237 has been set according to the printing density usually adopted by the user, the value of the initialization switch portion 237 is read in the step N2 at the time of turn-on of the power supply and the printing density is set at the time of initialization corresponding thereto. The printing density can be changed thereafter in response to a command from the data control portion 300 to be described afterwards (in the steps N27 to N35). The characters tc1, tc2 and tc3 shown in the figure are values set in the timer 213, representing periods of pulses synchronizing with the rotating speed of the polygon mirror 34 corresponding to the printing densities 1, 2 and 3, respectively.

The heater 229 and the polygon mirror 34 can not be immediately brought into a state ready for printing (referred to hereinafter as the READY state). More specifically, a transition period is required for the heater 229 until a predetermined temperature is attained, and a transition period is also required for the polygon mirror 34 until the rotating speed of the polygon mirror 34 becomes a predetermined speed. Accordingly, it is determined in the step N14 whether the heater 229 and the polygon mirror 34 are both in the READY state. If so, the status READY is set to 1 (in the step N15).

When the initial start control operation (in the step N2) is completed, that is, the READY state is established, a main loop is started. In the main loop, communication of status data is at first controlled (in the step N3). The status data of the data control portion 300 shown in Table 2 are read and the status data of the laser printer 1 is transmitted.

Then, command control operation is performed (in the step N4). More specifically, this step relates to processing at the time of receiving or transmitting the commands shown in Table 1.

Figure 14A:
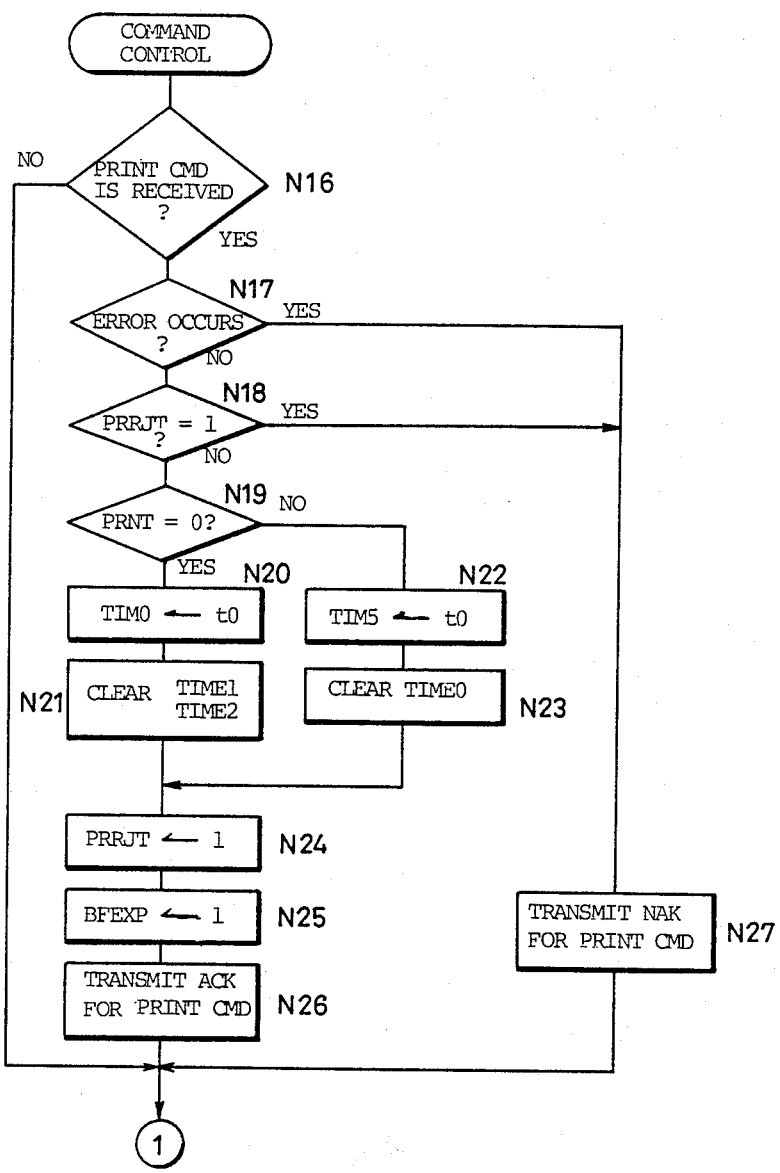
Figure 14B:
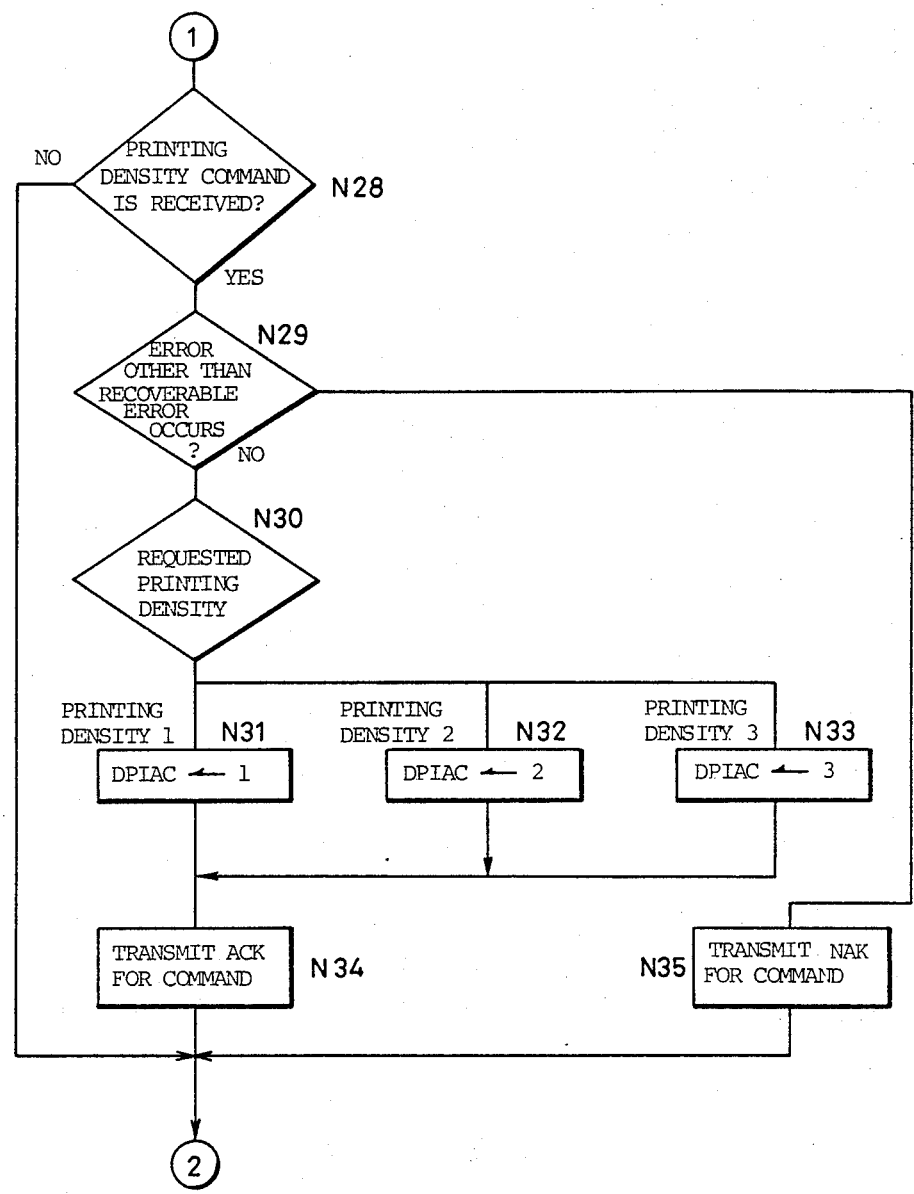
Figure 14C:
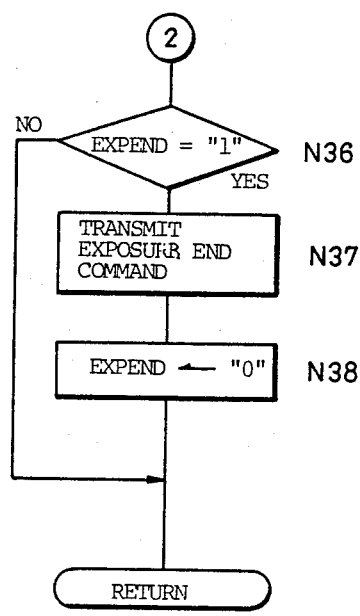

FIGS. 14A to 14C are flow charts showing details of the command control operation. Particularly, the steps N16 to N27 (shown in FIG. 14A) relate to processing at the time of receiving the print command. When the print command is received (in the step N16), it is determined whether an error occurs (in the step N17) and whether the apparatus is ready for accepting the print command based on the PRRJT flag (in the step N18). If an error does not occur and the apparatus is ready for accepting the print command, the print command is accepted. If the apparatus is not ready for accepting the print command, the data NAK is transmitted to the data control portion 300 (in the step N27). If the print command is accepted (in the step N19), and if the PRNT flag showing a printing state is 0, that is, printing is not being effected, the value t0 is set in the timer TIM 0 (in the step N20) and the timers TIME1 and TIME1 are cleared (in the step N21). On the other hand, if the PRNT flag is 1, the value t0 is set in the timer TIM5 (in the step N22) and the timer TIME0 is cleared (in the step N23). Printing operation is started in either the step N20 or the step N22. When printing operation is started, the PRRJT flag is set to 1 and acceptance of the print command is forbidden (in the step N24). In addition, the BFEXP flag indicating that exposure is not started is set to 1 (in the step N25) and the data ACK is transmitted to the data control portion 300 (in the step N26).

The steps N28 to N35 (shown in FIG. 14B) relate to processing at the time of receiving the printing density command.

When the printing density command is received (in the step N28), it is determined (in the step N29) whether an error other than a recoverable error such as emptiness of paper or toner occurs or not. If such an error occurs, the data NAK is transmitted to the data control portion 300 (in the step N35). If the error does not occur, the printing density command is accepted and the value 1, 2 or 3 is set in the DPIAC flag according to the request for the printing density (in the steps N31 to N33). Then, the data ACK is transmitted to the data control portion 300 (in the step N34).

The steps N36 to N38 (shown in FIG. 14C) relate to processing at the time of transmitting the exposure end command. If the EXPEND flag showing an end of exposure is 1 (in the step N36), the exposure end command is transmitted to the data control portion 300 (in the step N37) and then the EXPEND flag is cleared (in the step N38). Upon receipt of this command, the data control portion 300 prepares for transmission of the subsequent printing data. When the command control (in the step N4) is completed, the program proceeds to the sequence control (in the step N5).

Figure 15A:
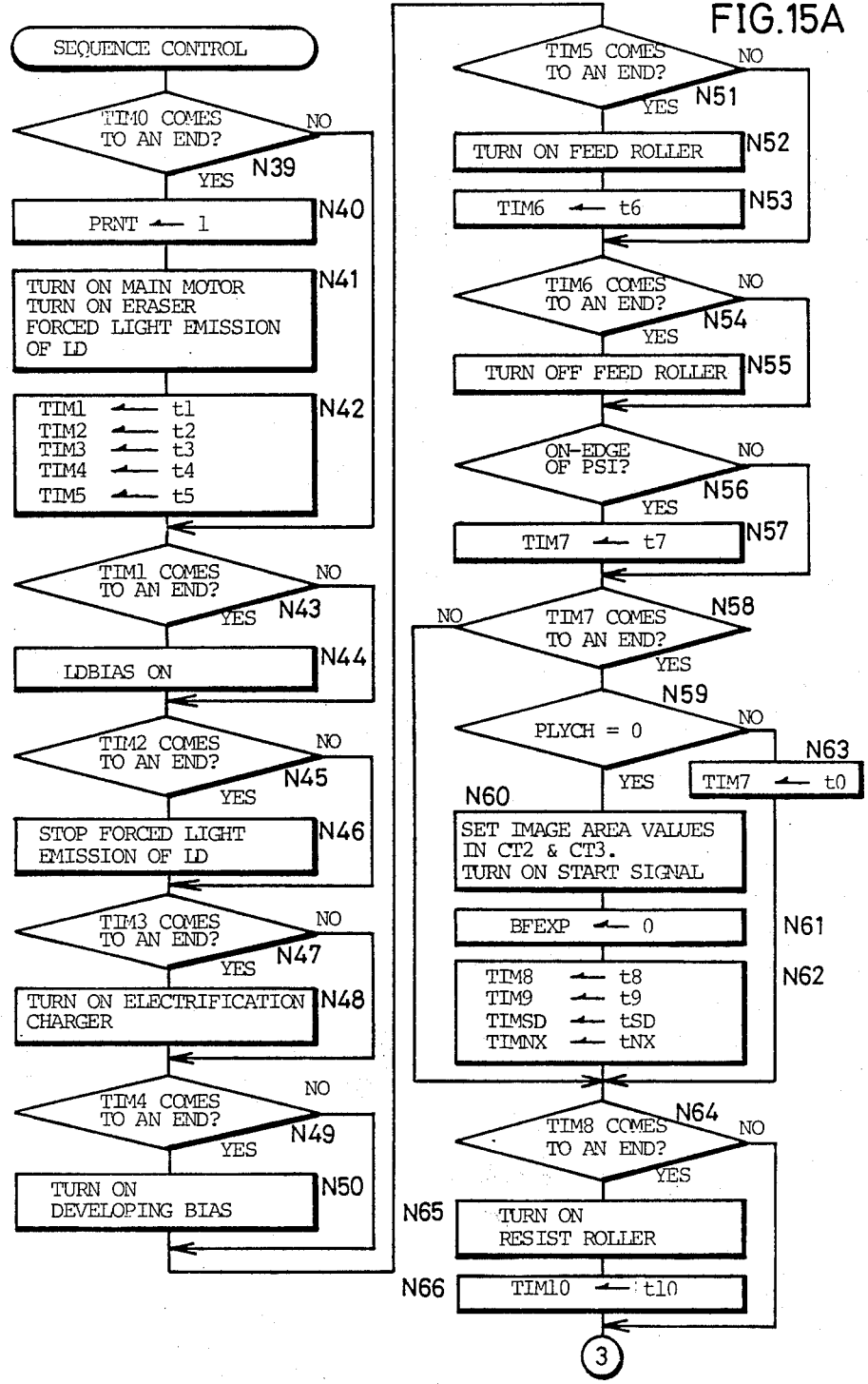
Figure 15B:
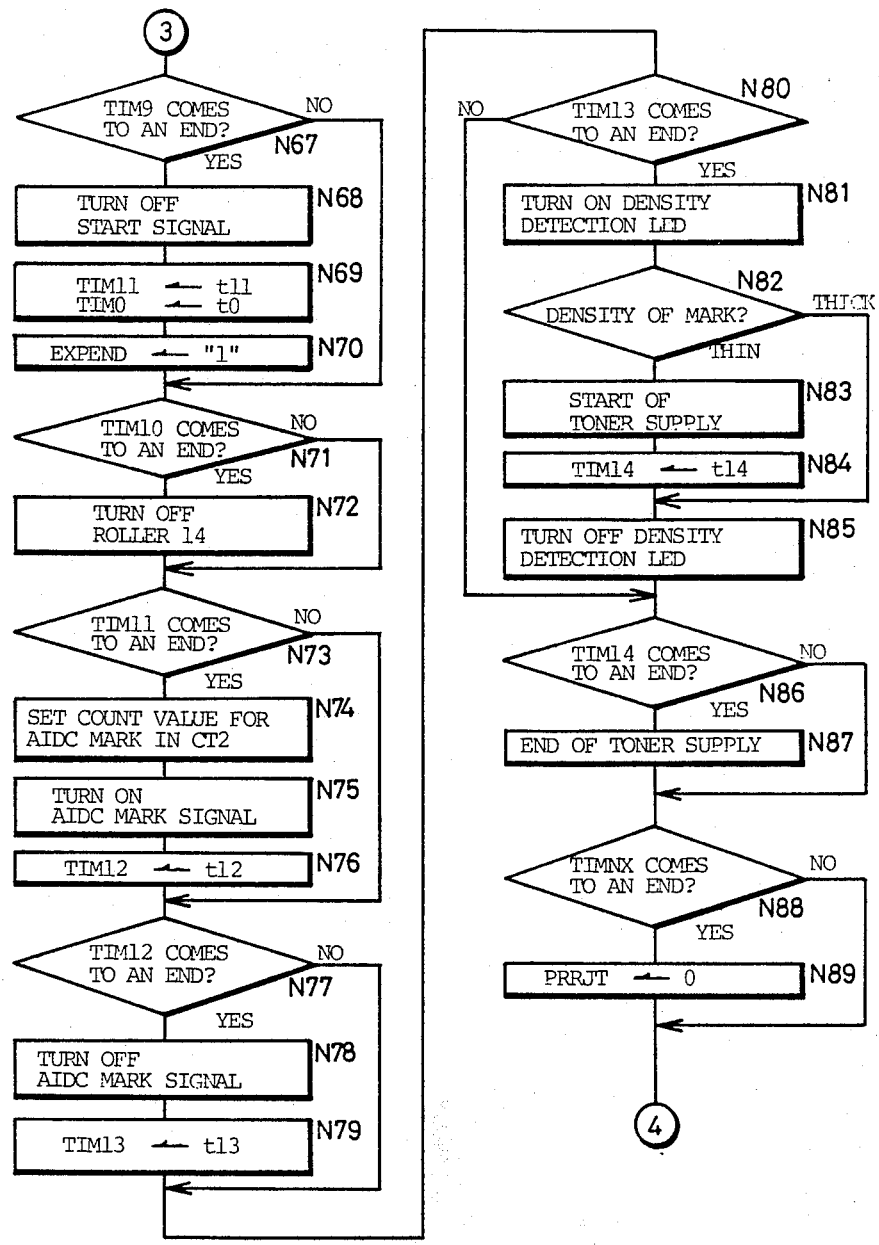
Figure 15C:
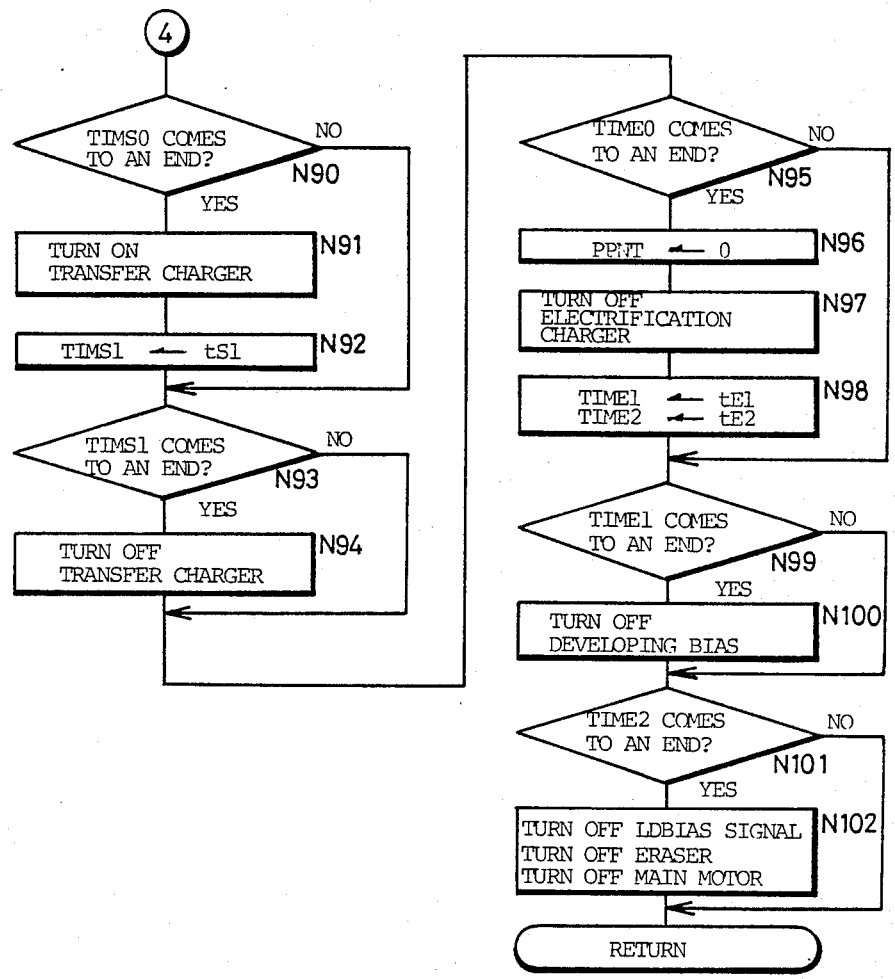

FIGS. 15A to 15C are flow charts showing details of sequence control. In this sequence control, successive turn-on and turn-off of the respective components required for printing operation are controlled by sequentially connecting the internal timers. This control is started by acceptance of the print command in the command control (in the step N4) and the sequential operation is started by setting the value t0 in the timer TIM0 or TIM5. The timing is shown in detail in the timing chart of FIG. 18.

When the value t0 is set in the timer TIM0 in the command control (in the step N4), measuring operation of this timer is immediately brought to an end in the step N39. Then, the respective components are turned on and off with the timing as shown in FIG. 18 by control procedures in the steps N39 to N101. On the other hand, if the value t0 is set in the timer TIM5 in the command control (in the step N4), this timer is immediately brought to an end in the step N51 and then procedures in the steps N51 to N101 are executed. The steps N39 to N50 relate to preparatory operation prior to printing operation. In those steps, the main motor 224, the eraser 8, the electrification charger 3 and the development bias voltage supplier 227 of the developing device 4 are turned on. On the other hand, in response to activation of the LDON signal and the LDBIAS signal, the LD 31 forcedly emits light. As a result, the scanning beam 39 is applied to the beam detector 38 and the sequential control in the printing data write control circuit 217 is started. The LDON signal becomes non-active after a lapse of a sufficient period for starting the above stated control.

The PRNT flag indicating the printing state is immediately set to 1 (in the step N40) when the timer TIM0 is brought to an end (in the step N39). This flag is reset to 0 when the sequential printing operation is completed (step N96).

The steps N51 to N55 relate to control for feeding paper. If a leading edge of paper passes through the paper sensor PS1 (in the steps N56 and N57), exposure is started after a lapse of a predetermined period (in the step N58). However, if the polygon mirror 34 is not rotated at constant speed, that is, the PCYCH flag is 1, exposure is not started and it is determined repeatedly whether the PCYCH flag is 0 or not (in the step N59). The PCYCH flag is changed to 0 (in the step N117) when it is determined in the step N116 (in FIG. 16) that the polygon mirror 34 is rotated at constant speed. When the rotating speed of the polygon mirror 34 becomes constant and the PCYCH flag becomes 0, suitable values according to the printing density and the paper size are set in the start counter 257 (CT2) and the end counter 258 (CT3) and the START signal S114 is activated to start exposure (in the step N60). As exposure is started by activation of the START signal S114, the BFEXP flag is reset to 0 (in the step N61).

Consequently, if the rotating speed of the polygon mirror 34 is changed prior to exposure upon receipt of the printing density change request for example, exposure is not started until it is determined that the rotating speed of the polygon mirror 34 becomes constant after the change.

When the exposure is brought to an end (in the steps N67 to N70), the START signal S114 becomes non-active (in the step N68) and the EXPEND flag indicating an end of exposure is set to 1 (in the step N70).

The steps N64 to N66, N71 and N72 relate to control of the registration roller 14. The roller 14 is turned on (in the step N65) after exposure with such timing as to enable transfer onto the paper at a predetermined position (i.e. after a lapse of a period t10 in this case), and it is turned off (in the step N67) when the paper completely passed through the roller 14.

The steps N73 to N86 relate to control for the AIDC mark. If a period t11 has passed after the exposure, a count value for determining a start position of the AIDC mark in the main scanning direction is set in the start counter 257 (in the step N74). The AIDC signal is immediately activated (in the step N75) and becomes non-activated after a period t12 (in the step N78). Thus, in the period t12, the mark is formed at the position in the main scanning direction determined by the printing data write control circuit 217. Thus, this mark is formed, based on the above stated count value, at the position enabling the density reader 9 to read it. The start counter 257 for determining a start position of an image area is also used to determine the start position of the mark in the main scanning direction and a special counter or timer is not used for formation of this mark. In addition, after a lapse of a period t13 (corresponding to a period in which the mark subjected to exposure is developed and arrives at the density reader 129) after the mark has been formed, an LED 223 for density detection is illuminated (in the step N81) and the density of the mark is checked (in the step N82). If the density is lower than a predetermined value, the solenoid 222 for toner supply is turned on (in the step N83) and after a period t14 it is turned off (in the steps N86 and N87).

The steps N88 and N89 relate to control for determining timing for accepting the subsequent print command. In this embodiment, the subsequent print command is accepted after a lapse of tNX after start of exposure (in the step N88) and at that time, the PRRJT flag forbidding acceptance of the print command is cleared (in the step N89).

The steps N90 to N94 relate to control for determining timing for turning on the transfer charger 5. The transfer charger 5 is turned on only when paper passes through the transfer charger 5. Thus, the transfer charger 5 can be prevented from being turned on when the AIDC mark passes through the charger 5, because if the transfer charger 5 is turned on that occasion, toner would be separated from the photoconductor 2 and would stain the apparatus.

The steps N95 to N102 relate &to control for stopping printing operation when a printing process is completed and another print request is not issued. When the sequence control (in the step N5) is completed, control of the image forming portion (in the step N6) is started.

Figure 16A:
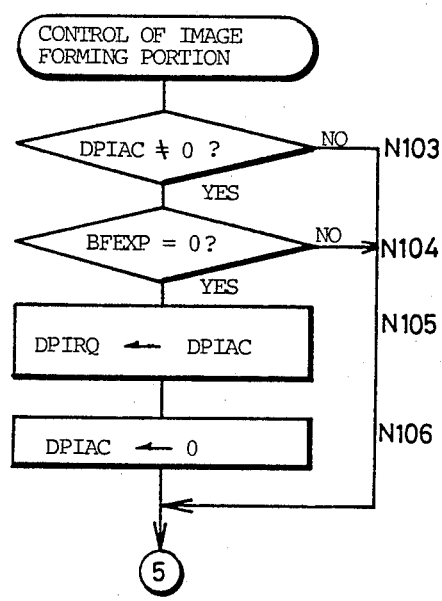
Figure 16B:
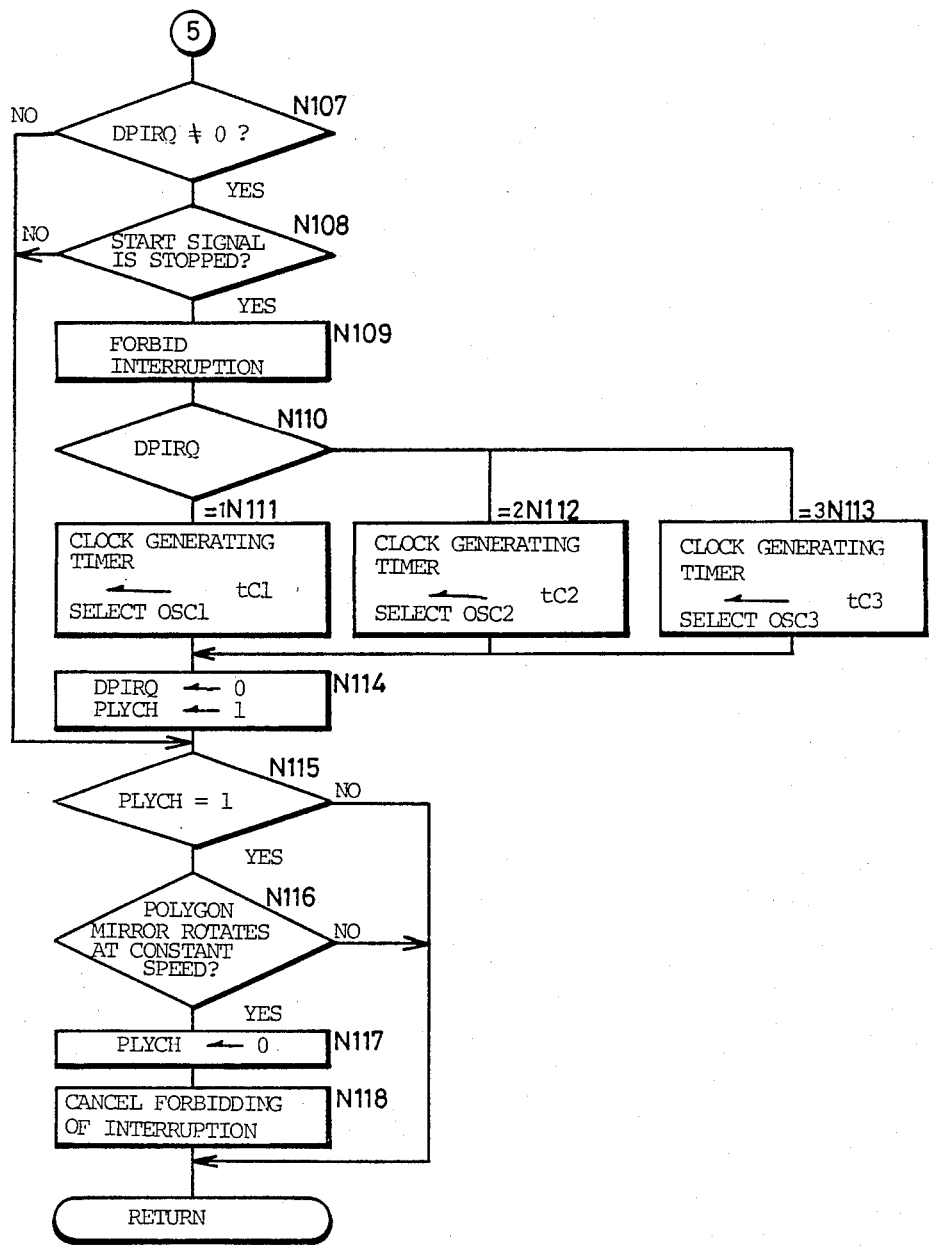

FIGS. 16A and 16B are flow charts showing details of control of the image forming portion. In those flow charts, the polygon mirror 34, the LD 31 and other portions related with image formation are controlled.

In the steps N103 to N108, timing for changing the printing density is determined when the printing density command is accepted. In other words, although the printing density command is accepted, if it is before a start of exposure for the previously accepted print command, the DPIRQ flag indicating the change request is not set (in the step N103 to N106). In addition, if the printing density command is accepted during exposure (when the START signal is activated) even after the start of the exposure, the printing density change request by the DPIRQ flag is not accepted (in the steps N107 and N108). Consequently, change of the printing density is started when all the exposure operations for printing are completed in response to the print commands accepted before the printing density command for the change is accepted.

When the printing density change request is accepted, interruption of the SSCANOUT signal is forbidden (in the step N109) and a suitable value tc1, tc2 or tc3 is set in the timer 213 to obtain the adequate rotating speed of the polygon mirror 34 and the fundamental clock frequency according to the requested printing density. In addition, a DPISELECT signal is transmitted to select clock pulses of a suitable oscillator (in the steps N110 to N113).

Subsequently, the DPIRQ flag is cleared and the PLYCH flag is set to 1 to indicate that the rotating speed of the polygon mirror 34 is not constant (in the step N114). While the PLYCH flag is 1 (in the step N115), it is determined whether the rotating speed of the polygon mirror 34 becomes constant or not in the step N116). If it becomes constant, the PLYCH flag is cleared (in the step N117) and the forbidding of interruption of the SSCANOUT signal is cancelled (in the step N118).

As described above, interrupt[on of the SSCANOUT signal is forbidden while the rotating speed of the polygon mirror 34 is not constant. During that period, the rotating speed of the polygon mirror 34 can not match with the fundamental clock frequently and there is a possibility that interruption of the SSCANOUT signal will occur although there is no abnormality, if the interruption is not forbidden.

Figure 17:
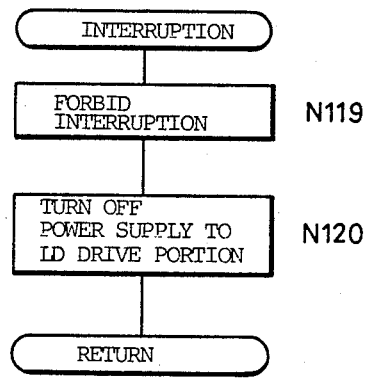

FIG. 17 is a flow chart showing processing when interruption of the SSCANOUT signal occurs. When an interruption occurs, the subsequent interruption is forbidden (in the step N119) and the power supply of the LD drive portion 118 is turned off (in the step N120), so that the LD 31 cannot emit light.

When control of the image foraing portion (in the step N6) is completed, error control (in the step N7) is started. In this control, errors such as emptiness of paper or toner, paper jam, failure of the eraser lamp or defects in portions subjected to high voltage are detected.

Finally, control procedures other than the printing control, such as display control, temperature control or detection of paper size, are performed. Then, the program returns to the step N3, where the above stated procedures are repeated.

Although a presettable down-counter is used as the timing means in the above described embodiment to perform the timer function when pulses of a predetermined period are applied to the counter, other counters or timers may be used insofar as substantially two kinds of time setting or time measurement operations can be performed to form an image area and a mark.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A laser printer means for scanning on a photoconductor a laser beam having modulation based on data, comprising:
    means for developing an electrostatic latent image formed on the photoconductor;
    means for detecting an end of a scanning range of the laser beam;
    means for enabling the laser beam to output a reference signal for start of scanning;
    timer means to be operated in response to said reference signal for start of scanning;
    a sensor for detecting a density of a toner image, said sensors being located functionally after said developing means and opposite the photoconductor;
    means for instructing formation of an image in the image area and formation of an image density detection mark outside the image area;
    means for setting a timer value in said timer means according to the content of the instruction of said instruction means, said timer value indicating an image formation start position in the scanning direction of a laser beam;
    means for starting modulation of the laser beam in response to an end of measurement of said timer means, and
    means for controlling said developing means based on a signal of said sensor, which detects the density of the toner image of the mark formed on the photoconductor.

2. A laser printer in accordance with claim 1, further comprising:
    means for defining a size of the image density detection mark in the scanning direction of the laser beam, said defining means being operated in response to a measurement of said timer means and outputting a signal for stopping the modulation of the laser beam when the size of the image density detection is scanned, in the scanning direction by the laser beam.

3. A laser printer in accordance with claim 2, further comprising:
    means for defining a size of the image density detection mark in a sub-scanning direction which is perpendicular to said scanning direction of laser beam.

* * * * *